United States Patent
Taniguchi et al.

(10) Patent No.: US 9,970,788 B2
(45) Date of Patent: May 15, 2018

(54) SCALE MEASURING DEVICE, METHOD FOR GENERATING POSITION INFORMATION, AND DEVICE WITH MULTI-AXIS STAGE

(71) Applicant: DMG MORI SEIKI CO., LTD., Nara (JP)

(72) Inventors: Kayoko Taniguchi, Kanagawa (JP); Shigeaki Maruyama, Kanagawa (JP); Masaaki Kusumi, Kanagawa (JP)

(73) Assignee: DMG MORI SEIKI CO., LTD., Nara (JP)

( * ) Notice: Subject to any disclaimer, the term of this patent is extended or adjusted under 35 U.S.C. 154(b) by 398 days.

(21) Appl. No.: 13/969,790

(22) Filed: Aug. 19, 2013

(65) Prior Publication Data

US 2014/0049252 A1  Feb. 20, 2014

(30) Foreign Application Priority Data

Aug. 20, 2012 (JP) .................................. 2012-181877
Aug. 19, 2013 (JP) .................................. 2013-169963

(51) Int. Cl.
  *G01D 5/20* (2006.01)
  *G01D 5/245* (2006.01)

(52) U.S. Cl.
  CPC ......... *G01D 5/2053* (2013.01); *G01D 5/2455* (2013.01)

(58) Field of Classification Search
  CPC ...... H03M 1/143; H03M 1/30; G01D 5/2053; G01D 5/2455; G01D 5/2451
  USPC .................................................. 324/207.21
  See application file for complete search history.

(56) References Cited

U.S. PATENT DOCUMENTS

| | | | | |
|---|---|---|---|---|
| 4,587,622 A | * | 5/1986 | Herzog | G01B 5/0009 318/569 |
| 4,772,835 A | * | 9/1988 | Weaver | G01B 7/004 318/575 |
| 5,252,825 A | * | 10/1993 | Imai | H03M 1/143 250/231.18 |
| 7,012,420 B2 | * | 3/2006 | Rodi | G01D 5/2448 324/207.12 |
| 2004/0111184 A1 | * | 6/2004 | Chiappetta | G05D 1/0242 700/245 |
| 2004/0178327 A1 | * | 9/2004 | Widdowson | G05B 19/401 250/221 |
| 2005/0073298 A1 | * | 4/2005 | Strasser | G01D 5/34746 324/207.23 |
| 2005/0116705 A1 | * | 6/2005 | Breuer | G01D 5/145 324/207.21 |

(Continued)

FOREIGN PATENT DOCUMENTS

| | | | | |
|---|---|---|---|---|
| DE | 4306634 A1 | * | 9/1993 | G01B 5/163 |
| DE | 102008010284 A1 | * | 8/2009 | G01B 5/0004 |

*Primary Examiner* — Melissa Koval
*Assistant Examiner* — Courtney McDonnough
(74) *Attorney, Agent, or Firm* — Osha Liang LLP

(57) ABSTRACT

A scale device includes a scale main body having at least two incremental tracks, at least two or more incremental signal detection heads for detecting incremental signals from the incremental tracks, and an operation processing unit that generates, based upon detection outputs by the two or more incremental signal detection heads, relative positional information in a measuring direction of a measuring axis and parallel movement amount information in a direction orthogonal to the measuring direction.

26 Claims, 17 Drawing Sheets

(56) References Cited

U.S. PATENT DOCUMENTS

| | | | | |
|---|---|---|---|---|
| 2010/0102804 A1* | 4/2010 | Burkhardt | ............ | G01D 5/2455 |
| | | | | 324/207.25 |
| 2010/0244815 A1* | 9/2010 | Burkhardt | .......... | G01D 5/24438 |
| | | | | 324/207.11 |
| 2012/0080883 A1* | 4/2012 | Hobdy | .................... | F03B 13/20 |
| | | | | 290/53 |
| 2012/0105866 A1* | 5/2012 | Pettersson | ............ | G01B 21/045 |
| | | | | 356/601 |

* cited by examiner

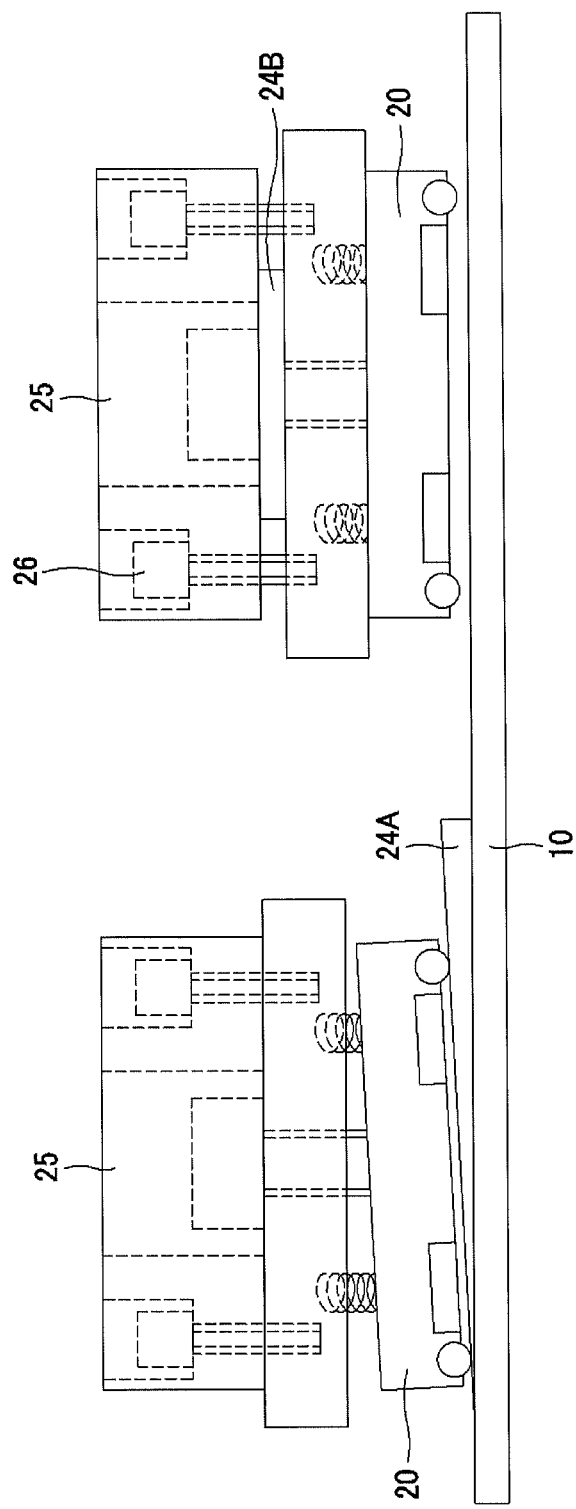

SCALE MEASURING DEVICE, METHOD FOR GENERATING POSITION INFORMATION, AND DEVICE WITH MULTI-AXIS STAGE

BACKGROUND OF THE INVENTION

Field of the Invention

The present invention relates to a scale device for use in, for example, a metal machining machine tool, an industrial machine, a precise length-measuring or angle-measuring device, or the like, as well as to a positional-information generation method and a multiaxial stage device.

Description of the Related Art

Moving table and stage of a highly precise class, which are used in a machine tool and a precise measuring device, are supported by a linear guide that is oil-pressure operated or provided with bearing balls or rollers placed therein. In the case when a rotary servo-motor is used as a driving unit, the rotary force of the motor is converted to a directly driving propelling force by ball screws or the like, and transmitted to a moving table or stage. Thus, the moving table or stage moves the workpiece, measuring object, tool or measuring device in forward and rearward directions or rightward and leftward directions, as well as in height directions. As a measuring device for measuring the position of the moving table or stage, an optical scale device and a magnetic scale device have been used.

Moreover, in order to carry out a machining process with higher precision, a method has been taken in which movement errors of a machine have been preliminarily measured and an instruction value containing a correction portion of the errors is generated so that movement precision of the machine is improved with repeatable reproducibility.

However, in an actual machine tool, since the weight and moments at the time of movements of a workpiece become different for each of machining processes, or since a guide surface of a bed wears with time or foreign matters are pinched therein, reproducibility between movements of a machine at the time when a correction value is acquired and actual movements at the time of the actual machining process is not necessarily ensured.

The inventors of the present invention previously proposed a technique (for example, see Accuracy Enhancement of High Precision Machine Tools by 2D Holographic Scale System 2011 the proceedings of ASCENTi-CNC2011 Annual Meeting) in which by using a two-dimensional holographic scale with high precision, a correction value for an actual machine tool is acquired with resolving power in the order of sub-nanometer, and by correcting an instruction value, the movement precision can be remarkably improved in comparison with the case in which no correction is made.

That is, in the previously proposed technique, as shown in FIG. 16, a two-dimensional holographic scale 3 serving as a reference scale is put on an XY table 2 of a machine tool 1, and by installing a two-dimensional sensor 4 at a tip of a spindle capable of moving in the Z-axis direction, movements of the machine tool 1 are preliminarily measured by using the two-dimensional holographic scale 3, and by forming a movement error map in accordance with a sequence of processes as shown in a flow chart of FIG. 17 so as to correct an instruction value, movement errors in the machine can be reduced. It has been confirmed through experiments that by adopting this technique, errors of a machine can be reduced.

However, in the case of actually carrying out a machining process in a machine tool, it is not possible to put a two-dimensional holographic scale serving as a reference scale on the XY-table of the machine tool.

Therefore, inventors of the present invention have carried out examinations as to what degree of error is generated after a correction due to influences from cutting reaction forces at the time of a machining process, a deflection of a bed caused by own weight of the workpiece, and the like, and have also carried out calculations by using a deflection calculation model in a small-size machine shown in FIGS. 18(A) and 18(B).

One reason for selecting this structure is that calculations can be carried out, with a change in gravity applied to a workpiece being excluded, and for simplicity of experiments, a machine main body is regarded as a rigid body, and it is supposed that no deformation due to an applied weight and moment inertia is caused and that an error is caused by a deformation of a guide considered to be the lowest in rigidity.

Moreover, in this calculation model, suppose that a cutting reaction force in the X-direction is represented by Fx, a cutting reaction force in the Y-direction is represented by Fy, a cutting reaction force in the Z-direction is represented by Fz, gravity applied to the X-axis is represented by Wx, gravity applied to the Y-axis is represented by Wy, a reaction force from a guide lower surface is represented by $R_1$, another reaction force from the guide lower surface is represented by $R_2$, still another reaction force from the guide lower surface is represented by $R_3$, and the other reaction force from the guide lower surface is represented by $R_4$.

In a deflection calculation model in this small-size machine, from equilibrium condition between own weight and cutting reaction force as well as equilibrium condition among moments around a roller, the following equations are satisfied:

$$R_1+R_2+R_3+R_4=Wx+Wy+Fy \quad (1)$$

$$FzY_1-FyZ_1+WxZ_2-(R_3+R_4)Z_3=0 \quad (2)$$

$$R_3+R_4=(WxZ_2-(FyZ_1+FzY_1))/Z_3 \quad (3)$$

$$FxY_1+(Wx+Wy+Fy)X_1/2-(R_2+R_4)X_1=0 \quad (4)$$

$$R_2+R_4=(Wx+Wy+Fy)/2+FxY_1/X_1 \quad (5)$$

$$R_1+R_3=(Wx+Wy+Fy)/2-FxY_1/X_1 \quad (6)$$

Therefore, by inputting numeric values used in the model to these, forces at the respective points are obtained, and by adjusting these to the specified points of a linear guide, a displacement forming an error can be found.

The guide used for the calculations is an LM guide HSR45L made by THK Co., Ltd. In this case, when, supposing that Fy=Fy=5 kN, Wx=6 kN, Wy=2 kN, calculations are approximately made, the error in a width change of R becomes 17 kN, and the displacement in a deformed data in the Y-direction of the guide derived from this becomes about 25 μm, and this amount is not ignorable. It is not impossible to carry out a correction in this direction by using a two-dimensional scale; however, since the measurement needs to be carried out, with the scale being made to stand in the Y-direction, it is not carried out easily. In order to carry out the correction in this direction, a scale is required by which three-dimensional measurements can be carried out.

On the other hand, in the case when displacement fluctuations due to own weight and force of inertia are observed in the same manner, from equilibrium condition among moments of inertia when the Y-axis is shifted, the following equations are satisfied in the same manner:

$$WxZ_2=(R_3+R_4)Z_3 \quad (7)$$

$$(R_1+R_2)Z_3-(Wy\pm Wy)Z_3-Wx(Z_3-Z_2)=0 \quad (8)$$

Moreover, from equilibrium condition among moments of inertia when the X-axis is shifted, the following equations are satisfied.

$$WyY_1+WxY_2+(Wx+Wy)X_1/2=(R_2+R_4)X_1 \quad (9)$$

$$-WyY_1-WxY_2+(Wx+Wy)X_1/2=(R_1+R_3)X_1 \quad (10)$$

In the case of calculating R supposing that the acceleration is 1G by adding changes of R in the case of individual movements, it is changed with a width of 8.8 kN, and it is found that the displacement in the Y-direction due to this change is about 10 μm, which is a value that has to be put into consideration in high-precision machining. Moreover, errors in the X and Z directions due to own weight and moments of inertia can be removed at the initial correction in this structure; however, errors due to changes with time, such as wearing, cannot be removed.

When examinations are made as to what degree the initial correction value is changed to by an expected change in machining conditions, such as changes in moments due to a deflection of a bed caused by a weight change of a workpiece and a change in the center of gravity, it is found that in order to ensure machining precision, a monitoring process can be carried out to find that the change in the correction value is small relative to desired precision or an additional correction can be carried out in accordance with the change in conditions. Of course, these corrections are not required when a two-dimensional or a three-dimensional scale serving as reference is used for controlling or when a monitoring scale is always used in addition to a controlling scale.

However, a special scale of a two-dimensional or three-dimensional type has a disadvantage in that a large detection area is required. For this reason, always mounting this scale onto a machine results in a bulky machine size, and since the scale of this type requires a detection area that is larger than that of a general-use one-dimensional scale by two digits or more, manufacturing costs become very high, with the result that it becomes difficult to provide a high cost performance although high precision is achieved. Moreover, from the viewpoint of reliability, since a difficult designing process is required to install a protector for protecting the wide detection area from chips and coolants, and since even in the case of using a cover the same as that of the one-dimensional scale, a trouble occurrence rate becomes a multiple of the detection area, it is not a practical solution to always use a two-dimensional or three-dimensional scale for controlling or correcting a machine tool.

Moreover, it has been known that an optical scale device that optically reads scales recorded on an optical scale is inappropriate for use in measurements in poor environments contaminated with cutting fluids, chips and the like, while a magnetic scale device that magnetically reads scales recorded on a magnetic scale is durable to such poor environments.

SUMMARY OF THE INVENTION

One or more embodiments of the present invention carry out a detection of a displacement in two-dimensional or more by using a compact device at low costs.

Moreover, one or more embodiments of the present invention provide a scale device that can obtain the absolute positional information in a measuring direction of a measuring axis, relative positional information and parallel movement amount in a direction orthogonal to the measuring direction and angular information in yawing direction, and be utilized as a reference scale for use in correcting movement errors of a machine.

Furthermore, one or more embodiments of the present invention provide a multiaxial stage device capable of carrying out correction in movement errors of each of axes by using the above-mentioned scale device.

Other advantages obtained by one or more embodiments of the present invention will become apparent from the detailed description.

One aspect of the present invention relates to a scale device that may be provided with: a scale main body having at least two incremental tracks; at least two or more incremental signal detection heads for detecting incremental signals from the incremental tracks; and an operation processing unit which based upon detection outputs by the two or more incremental signal detection heads, generates relative positional information in a measuring direction of a measuring axis and parallel movement amount information in a direction orthogonal to the measuring direction.

In another aspect of the present invention, the scale device may be provided with three or more of the incremental signal detection heads, and based upon detection outputs by the three or more incremental signal detection heads, the operation processing unit generates movement amount information in directions of respective X, Y and Z axes and rotation angle information around the respective axes.

In still another aspect of the present invention, the scale device may be configured such that the measurement principle is magnetic, having a magnetic recording medium in which at least two incremental tracks are magnetically recorded and the incremental signal detection heads are magnetic detection heads.

In still another aspect of the present invention, the magnetic detection heads may be prepared as, for example, magnetic tunnel effect elements.

In still another aspect of the present invention, the scale device may be provided with: a support mechanism for supporting the incremental signal detection heads by a single fulcrum so as to freely swing thereon, with each of the incremental signal detection heads being operated in a manner like a pendulum.

Moreover, in the scale device in accordance with one or more embodiments of the present invention, the scale device may be configured such that the scale main body is provided with an absolute track on which an absolute pattern is recorded and incremental tracks formed by recording incremental signal patterns in a manner so as to be inclined relative to a measuring direction on two sides of the absolute track, as well as a single absolute pattern detection head for detecting the absolute pattern from the absolute track of the scale main body and at least two incremental signal detection heads for detecting incremental signals from the incremental tracks, and in this structure, the operation processing unit generates absolute positional information based upon a detection output by the absolute pattern detection head, and also generates relative positional information in a measuring direction of a measuring axis and parallel movement amount information in a direction orthogonal to the measuring direction based upon detection outputs by the at least two incremental signal detection heads located on the two incremental tracks formed with the absolute track being sandwiched therebetween.

In still another aspect of the present invention, the scale device may be provided with, for example, at least three incremental signal detection heads, and based upon detection outputs by two incremental signal detection heads located apart from each other in the measuring direction of a measuring axis on the incremental track, the operation processing unit generates parallel movement amount information in a direction orthogonal to the measuring direction and rotation angle information in yawing direction.

In still another aspect of the present invention, the scale device may be configured such that the operation processing unit further calculates distances between the at least three incremental signal detection heads and the scale based upon strength of signals detected by the incremental signal detection heads, and generates parallel movement amount information in a Z-direction and rolling and pitching angle information.

In still another aspect of the present invention, the scale device may be configured such that the operation processing unit is further provided with a correction table in which changes relative to changes in the scale-to-head distance of detection outputs by the at least three incremental signal detection heads are preliminarily recorded.

In still another aspect of the present invention, the scale device may be further provided with: measuring means for measuring change information relative to a change in a scale-to-head distance of the detection output by the at least three incremental signal detection heads, after having been installed in a measurement-subject device; and correction data recording means for writing correction data formed based upon the change information obtained by the measuring means in the correction table.

In still another aspect of the present invention, the scale device may be a magnetic scale having a magnetic recording medium in which an absolute pattern and incremental signal patterns are magnetically recorded, and the absolute pattern detection head and the incremental signal detection heads are magnetic detection heads.

In still another aspect of the present invention, the incremental tracks may be formed by magnetically recording incremental signal patterns on two sides of the absolute track in a manner so as to be inclined by 45 degrees in reversed directions relative to a measuring direction. The magnetic detection head may be prepared, for example, as a single magnetic tunnel effect element.

In still another aspect of the present invention, the scale device may be provided with: a scale having incremental tracks on which incremental patterns are recorded, incremental signal detection heads for detecting the incremental patterns, and operation means for finding a relationship between the strength of the incremental signal detected by the incremental signal detection head and a distance between the scale and the incremental signal detection head.

In still another aspect of the present invention, a multi-axial stage device may be provided with: a scale main body having an absolute track with an absolute pattern and incremental tracks formed by incremental signal patterns placed on two sides of the absolute track in a manner so as to be inclined by 45 degrees in reversed directions relative to a measuring direction, which is placed on each of axes; and an operation processing unit which based upon a detection output by an absolute pattern detection head for detecting the absolute pattern from the absolute track of the scale main body of each of the axes, generates absolute positional information, and by detecting incremental signals by two or more incremental signal detection heads from the incremental tracks, based upon detection outputs by the two or more incremental signal detection heads located on two incremental tracks formed with the absolute track being sandwiched therebetween, generates relative positional information in a measuring direction on a measuring axis and parallel movement amount information in a direction orthogonal to the measuring direction so that positional information is obtained, with the positional data obtained from the scale main bodies of the respective axes being mutually supplemented.

In still another aspect of the present invention, the multiaxial stage device may be configured such that two or more of the scale main bodies are attached to an XY stage so that positional information is obtained, with the positional data obtained from the scale main bodies of the respective axes being mutually supplemented.

In still another aspect of the present invention, the multiaxial stage device may be configured such that three or more of the scale main bodies are attached to an XYZ stage so that positional information is obtained, with the positional data obtained from the scale main bodies of the respective axes being mutually supplemented.

In still another aspect of the present invention, the multiaxial stage device may be further provided with: alarm generation means for generating an alarm in the case when among positional data obtained from the scale main bodies of the respective axes, a displacement other than the displacement of the corresponding measuring axis exceeds a predetermined value.

In still another aspect of the present invention, the multiaxial stage device may be configured such that three or more of the incremental signal detection heads are installed, and based upon detection outputs by the three or more incremental signal detection heads, the operation processing unit generates movement amount information in directions of respective X, Y and Z axes and rotation angle information around the respective axes.

In still another aspect of the present invention, the multiaxial stage device may be configured such that at least three of the incremental signal detection heads are installed, and based upon detection outputs by two incremental signal detection heads located apart from each other in the measuring direction of a measuring axis on the incremental track, the operation processing unit generates parallel movement amount information in a direction orthogonal to the measuring direction and rotation angle information in yawing direction so that positional information is obtained, with the positional data obtained from the scale main bodies of the respective axes being mutually supplemented.

In still another aspect of the present invention, the multiaxial stage device may be configured such that the measurement principle is magnetic, having a magnetic recording medium in which an absolute track with the absolute pattern and the at least two incremental tracks are magnetically recorded, and the incremental signal detection heads are magnetic detection heads.

In still another aspect of the present invention, the multiaxial stage device may be configured such that the magnetic detection head is a tunnel Magneto-Resistance Effect element.

In still another aspect of the present invention, a scale device may be provided with: a scale having an incremental track on which an incremental pattern is recorded; an incremental signal detection head for detecting the incremental pattern; and a correction table on which a relationship between the strength of the incremental signal detected by the incremental signal detection head and a distance between the scale and the incremental signal detection head has been preliminarily recorded.

In still another aspect of the present invention, the scale device may be further provided with: a correction table for correcting a relationship between the incremental signals in association with the distance between the scale and the incremental signal detection head and a movement distance in a measuring direction.

In still another aspect of the present invention, the scale device may be further provided with: a correction table in which changes relative to changes in the scale-to-head distance of detection outputs by at least three incremental signal detection heads are preliminarily recorded, and in this configuration, by using the correction table, distances between the at least three incremental signal detection heads and the scale are calculated based upon strength of signals detected by the incremental signal detection heads so that parallel movement amount information in a Z-direction and rolling and pitching angle information are generated.

In still another aspect of the present invention, the scale device may be configured such that the measurement principle is magnetic, having a magnetic recording medium in which the incremental pattern is magnetically recorded and the incremental signal detection head is a magnetic detection head.

In still another aspect of the present invention, a positional-information generation method for a scale device constituted by a scale having an incremental track on which an incremental pattern is recorded and an incremental signal detection head for detecting the incremental pattern may be provided with the steps of: by using a correction table on which a relationship between the strength of the incremental signal detected by the incremental signal detection head and a distance between the scale and the incremental signal detection head has been preliminarily recorded, based upon a detection output by the incremental signal detection head, generating relative positional information in a measuring direction on a measuring axis and positional information corresponding to a distance between the scale and the incremental signal detection head.

In still another aspect of the present invention, the positional-information generation method may be further provided with the step of: by using a correction table in which changes relative to changes in the scale-to-head distance of detection outputs by the at least three incremental signal detection heads have been preliminarily recorded, calculating a distance between each of the at least three incremental signal detection heads and the scale from the strength of a signal detected by the incremental signal detection heads so as to generate parallel movement amount information in a Z-direction and rolling and pitching angle information.

In the other aspect of the present invention, the positional-information generation method may be designed such that the scale main body is prepared as a magnetic scale having a magnetic recording medium on which the incremental pattern is recorded, with the incremental signal detection head being prepared as a magnetic detection head.

One or more embodiments of the present invention make it possible to provide a scale device that can provide absolute positional information in a measuring direction of a measuring axis, relative positional information and a parallel movement amount in a direction orthogonal to the measuring direction, and be utilized as a reference scale for use in correcting movement errors of a machine.

In accordance with one or more embodiments of the present invention, it is possible to provide a scale device that can obtain angular information in yawing direction together with the absolute positional information in a measuring direction of a measuring axis, relative positional information and parallel movement amount in a direction orthogonal to the measuring direction, and be utilized as a reference scale for use in correcting movement errors of a machine.

Moreover, one or more embodiments of the present invention also make it possible to provide a multiaxial stage device capable of correcting movement errors in each of the axes by using the above-mentioned scale device.

Furthermore, one or more embodiments of the present invention makes it possible to provide a scale device and a multiaxial stage device which are adapted to correct errors by using a combination of built-in-type one dimensional magnetic scales that are highly resistant to environmental loads when a change in correction values at the time of a machine assembling process is monitored.

In accordance with one or more embodiments of the present invention, since a correction table is prepared in which a relationship between the strength of an incremental signal detected by an incremental signal detection head and the distance between the scale and an incremental signal detection head has been preliminarily recorded, it becomes possible to generate positional information in accordance with the distance between the scale and the incremental signal detection head by using the correction table, together with relative positional information in the measuring direction of the measuring axis, based upon a detection output given by the incremental signal detection head.

Moreover, in accordance with one or more embodiments of the present invention, by using a correction table in which the change in a detection output by each of at least three incremental signal detection heads relative to the change in the scale-to-head distance is preliminarily recorded, the distance between each of at least the three incremental signal detection heads and the scale is calculated by the strength of a signal detected by the incremental signal detection head so as to generate parallel movement amount information in a Z-axis direction and rolling and pitching angle information; therefore, it is possible to provide a scale device that has a compact size and is capable of detecting a displacement in two or more dimensions at low costs.

BRIEF DESCRIPTION OF THE DRAWINGS

FIGS. 6A and 6B are views showing a head unit and a scale main body for use in explaining a sequence of forming processes of a correction table used in the operation processing unit according to one or more embodiments of the present invention.

DETAILED DESCRIPTION OF THE EMBODIMENTS

Referring to the figures, the following description will discuss one or more embodiments of the present invention in detail.

Figure 1:
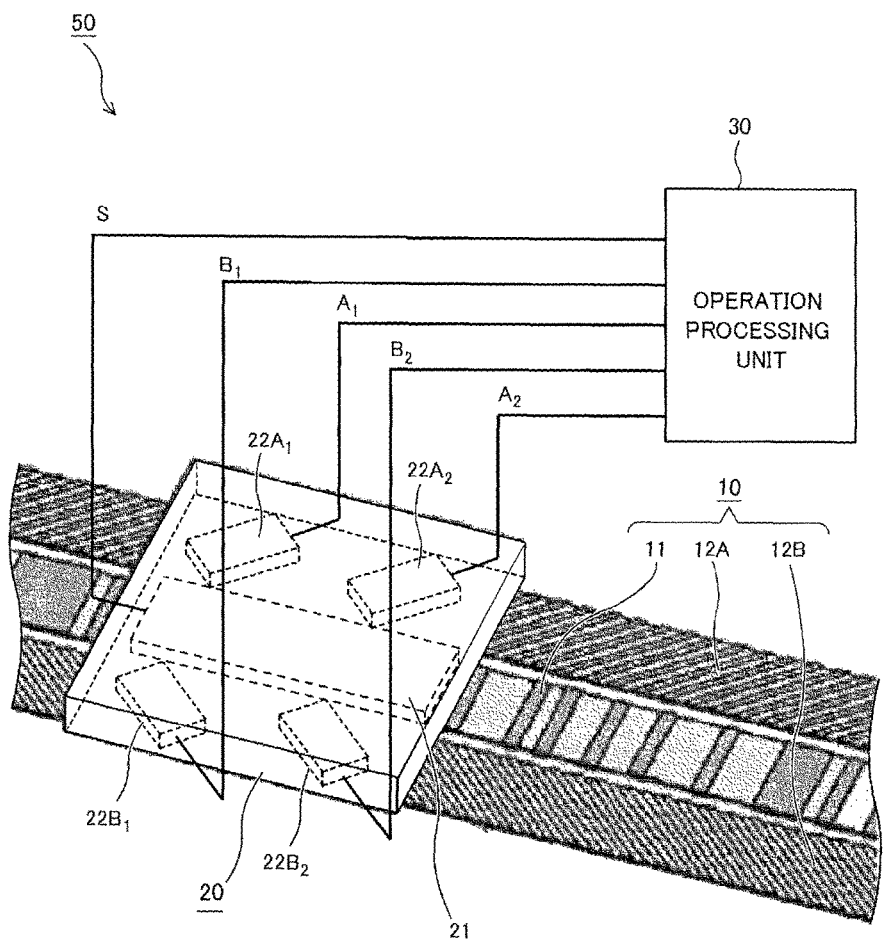
FIG. 1 is a perspective view showing a configuration of a magnetic scale device to which one or more embodiments of the present invention are applied.

One or more embodiments of the present invention are applied to a magnetic scale device 50 having a configuration, for example, shown in FIG. 1.

This magnetic scale device 50 is constituted by a scale main body 10, a head unit 20 and an operation processing unit 30.

The scale main body 10 is provided with an absolute track 11 in which an M-code pattern (absolute pattern) indicating the absolute value in a main moving direction is magnetically recorded, and incremental tracks 12A and 12B that are formed by magnetically recording incremental signal patterns on two sides of this absolute track 11 so as to be inclined by 45 degrees in reversed directions relative to a measuring direction. That is, the lattices of the incremental tracks 12A and 12B are disposed with an inclined angle of 45 degrees relative to the moving direction, and located in directions mutually orthogonal to each other. Moreover, the absolute track 11 has the M-code pattern indicating the absolute value in the main moving direction magnetically recorded thereon as the absolute pattern.

Moreover, the head unit 20 is provided with a single absolute pattern detection head 21 for detecting the absolute pattern from the absolute track 11 of the scale main body 10 and at least three or more (in this case, four) incremental signal detection heads $22A_1$, $22A_2$, $22B_1$ and $22B_2$ for detecting incremental signals from the incremental tracks 12A and 12B.

Figure 2:
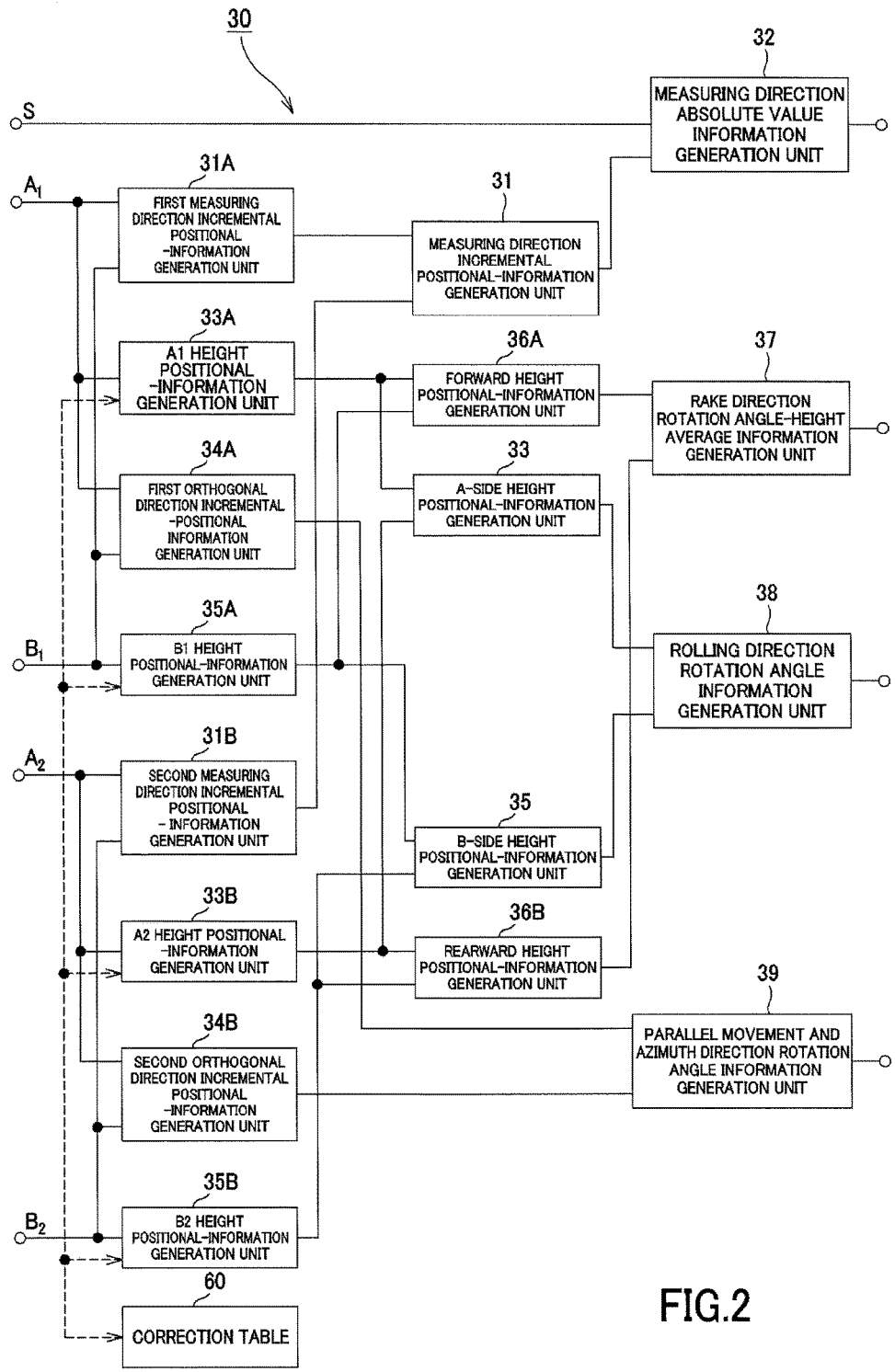
FIG. 2 is a block diagram showing a functional configuration of an operation processing unit in the magnetic scale device according to one or more embodiments of the present invention.

Furthermore, the operation processing unit 30 is configured by computers functioning as various information generation units 31 to 39 shown in a block diagram of FIG. 2.

That is, the operation processing unit 30 calculates respective additions $(A_1+B_1)$ and $(A_2+B_2)$ of detection outputs $(A_1, A_2)$ obtained by the incremental signal detection heads $22A_1$ and $22A_2$ that detect incremental signals recorded in the incremental track 12A and detection outputs $(B_1, B_2)$ obtained by the incremental signal detection heads $22B_1$ and $22B_2$ that detect incremental signals recorded in the incremental track 12B, located so as to sandwich the absolute track 11 together with the incremental track 12A, by a first measuring direction relative positional-information generation unit 31A and a second measuring direction relative positional-information generation unit 31B, and based upon the respective additions $(A_1+B_1)$ and $(A_2+B_2)$, relative positional information indicating relative positions on the main movement axis by a measuring direction relative positional-information generation unit 31.

Moreover, based upon the relative positional information indicating the relative positions on the main movement axis generated by the measuring direction relative positional-information generation unit 31 and a detection output S by the absolute pattern detection head 21 for detecting the absolute pattern (M-code pattern) from the absolute track 11 of the scale main body 10, the operation processing unit 30 reads the absolute value in the main movement direction represented by the M-code pattern and generates absolute positional information indicating the absolute position on the main movement axis, by using the absolute positional-information generation unit 32, and combines the absolute positional signal that is rough in resolving power with an incremental signal that is fine in resolving power in synchronism therewith so that absolute positional information having high resolving power is produced. On the other hand, the operation processing unit 30 reads a movement distance in an orthogonal direction at an AB point from respective differences $(A_1-B_1)$ and $(A_2-B_2)$ of detection outputs $B_1$, $B_2$ obtained by the incremental signal detection heads $22B_1$ and $22B_2$ so that parallel movement information and rotation information in yawing direction are generated by a parallel movement and yawing direction rotation information generation unit 39.

In this case, the incremental signal detection heads $22A_1$, $22A_2$, $22B_1$ and $22B_2$ are disposed with such recording wavelengths and set distances as to allow processed signal outputs to change depending on distances to the incremental tracks 12A and 12B, and by detecting the sized of the respective outputs $A_1$, $A_2$, $B_1$ and $B_2$, the operation processing unit 30 can calculate respective distances between the incremental signal detection heads $22A_1$, $22A_2$, $22B_1$ and $22B_2$ and the incremental tracks 12A and 12B, that is, gap amounts therebetween, by detecting the sizes of the respective detection outputs $A_1$, $A_2$, $B_1$ and $B_2$.

Therefore, from height positional information $A_1$ obtained by an A1 height positional-information generation unit 33A on the basis of the signal level of the detection output $A_1$ obtained by the incremental signal detection head $22A_1$ and height positional information $B_1$ obtained by a B1 height positional-information generation unit 35B on the basis of the signal level of the detection output $B_1$ obtained by the incremental signal detection head $22B_1$, the operation processing unit 30 generates forward height positional information by using a forward height positional-information generation unit 36A based upon the addition $(A_1+B_1)$ thereof.

Moreover, from height positional information $A_2$ obtained by an A2 height positional-information generation unit 33B on the basis of the signal level of the detection output $A_2$ obtained by the incremental signal detection head $22A_2$ and height positional information $B_3$ obtained by a B2 height positional-information generation unit 35B on the basis of the signal level of the detection output $B_2$ obtained by the incremental signal detection head $22B_2$, the operation processing unit 30 generates rearward height positional information by using a rearward height positional-information generation unit 36B based upon the addition $(A_2+B_2)$ thereof.

Moreover, the operation processing unit 30 generates rake-direction rotation angle information and height average information by using a rake-direction rotation angle-height average information generation unit 37, based upon a difference $((A_1+B_1)-(A_2+B_2))$ between the forward height positional information $(A_1+B_1)$ calculated by the forward height positional-information generation unit 36A and the rearward height positional information $(A_2+B_2)$ calculated by the rearward height positional-information generation unit 36B.

Furthermore, from the height positional information $A_1$ obtained by the A1 height positional-information generation unit 33A on the basis of the signal level of the detection output $A_1$ obtained by the incremental signal detection head $22A_1$ from the incremental track 12A and height positional information $B_2$ obtained by a A2 height positional-information generation unit 33B on the basis of the signal level of the detection output $A_2$ obtained by the incremental signal detection head $22A_2$ from the incremental track 12A, the operation processing unit 30 generates A-side height positional information by using an A-side height positional-information generation unit 33 based upon the difference $(A_1-A_2)$ thereof.

From the height positional information $B_1$ obtained by the B1 height positional-information generation unit 35A on the basis of the signal level of the detection output $B_1$ obtained by the incremental signal detection head $22B_1$ from the incremental track 12B and height positional information $B_2$ obtained by a B2 height positional-information generation unit 35B on the basis of the signal level of the detection output $B_2$ obtained by the incremental signal detection head $22B_2$ from the incremental track 12B, the operation processing unit 30 generates rear height positional information by using a B-side height positional-information generation unit 35 based upon the difference $(B_1-B_2)$ thereof.

Moreover, based upon the A-side height positional information $(A_1-A_2)$ calculated by the A-side height positional-information generation unit 33 and the B-side positional information $(B_1-B_2)$ calculated by the B-side height positional-information generation unit 35, the operation processing unit 30 generates rotation angle information in a rolling direction by using a rolling direction rotation angle information generation unit 38.

The magnetic scale device 50 having this configuration makes it possible to obtain not only the relative positional information indicating relative positions together with the absolute position information indicating the absolute position on the main movement axis, but also parallel movement amount information in a direction orthogonal to the main movement axis, rotation angle information in yawing direction, rotation angle information in a pitching direction and rotation angle information in a rolling direction by using the operation processing unit 30 so that it can be used as a reference scale for correcting movement errors of a machine.

Additionally, in the magnetic scale device 50, the head unit 20 is adapted to have the incremental signal detection heads $22A_1$, $22A_2$, $22B_1$, $22B_2$ of two by two for each track, that is, the total four detection heads, in order to obtain relative positional information from the incremental tracks 12A and 12B; however, as long as detection outputs from at least three incremental signal detection heads can be obtained, it becomes possible to obtain the relative positional information in a measuring direction on the measuring axis, parallel movement amount information in a direction orthogonal to the measuring direction and rotation angle information in yawing direction.

Figure 3:
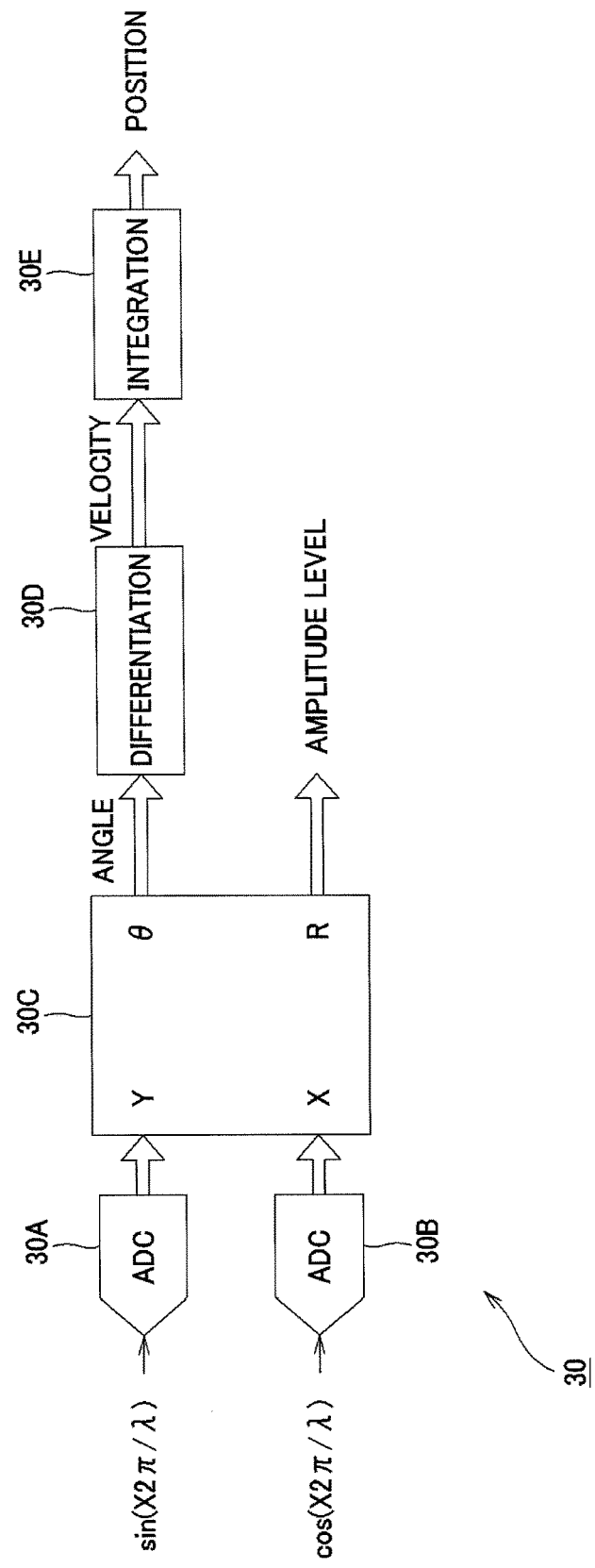
FIG. 3 is a block diagram showing a configuration of the operation processing unit according to one or more embodiments of the present invention.

In this case, the detection outputs obtained by the incremental signal detection heads $22A_1$, $22A_2$, $22B_1$, $22B_2$ from the incremental tracks 12A and 12B correspond to a sine signal $(\sin(X2\pi/\lambda))$ and a cosine signal $(\cos(X2\pi/\lambda))$ having a $\lambda$ cycle, and in the operation processing unit 30, as shown in FIG. 3, these signals are quantized by AD converters 30A and 30B, and inputted to a Pythagorean operational unit 30C.

Figure 4:
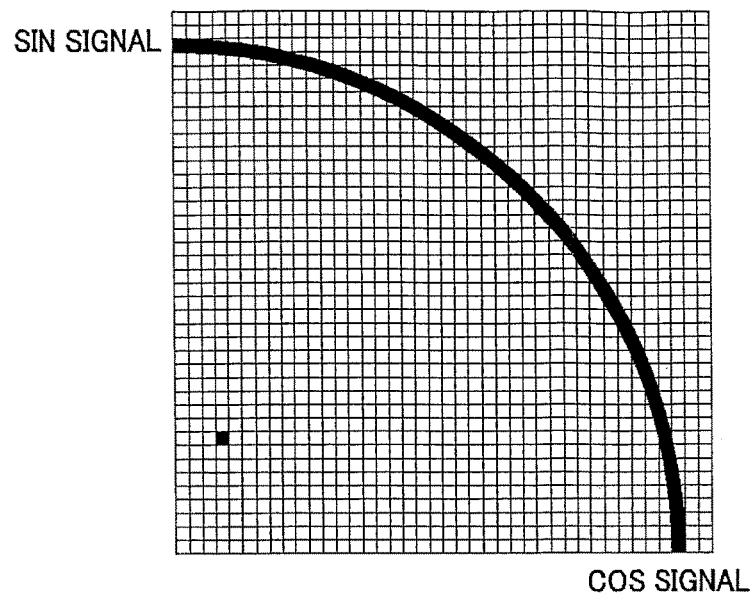
FIG. 4 is a view showing a lookup table for use by Pythagorean operational unit in the operation processing unit according to one or more embodiments of the present invention.
Figure 5:
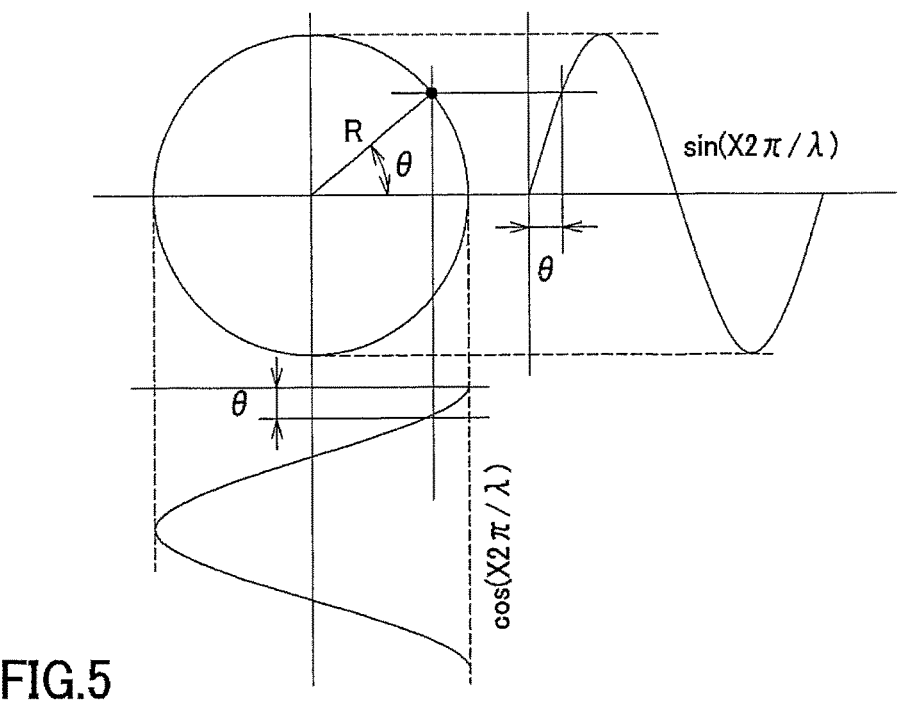
FIG. 5 is a view showing a relationship between a phase angle $\theta$ and an amplitude level R of a sine signal ($\sin(X2\pi/\lambda)$) and a cosine signal ($\cos(X2\pi/\lambda)$) having a $\lambda$ cycle inputted to the operation processing unit according to one or more embodiments of the present invention.

In the Pythagorean operational unit 30C, a phase angle $\theta$ and an amplitude level R are calculated by reference to a lookup table shown in FIG. 4. The sine signal $(\sin(X2\pi/\lambda))$ and cosine signal $(\cos(X2\pi/\lambda))$ having a $\lambda$ cycle, the phase angle $\theta$ and the amplitude level R have relationships as shown in FIG. 5.

Moreover, the operation processing unit 30 obtains velocity information by differentiating the phase angle $\theta$ information by a differentiator 30D, and by integrating this velocity information by an integrator 30E, positional information is obtained so that high resolving power can be obtained.

Furthermore, in the magnetic scale device 50, as shown in FIG. 2, the operation processing unit 30 is provided with a correction recording means, which has a correction table 60 of positions relative to voltage, on which a change in each of the detected outputs by the at least three incremental signal detection heads relative to the change in the scale-to-head distance of scale heads has been preliminarily recorded, and after a subject device to be measured has been installed, measures change information relative to the change of the scale-to-head distance of the detected outputs by the at least three incremental signal detection heads, and then writes correction data on the basis of the resulting change information in the correction table. Thus, in the magnetic scale device 50, upon actual use, the operation processing unit 30 obtains height data from the correction table based upon the amplitude R calculated from a scale signal.

The correction table 60 is formed in the following manner.

Figure 7A:
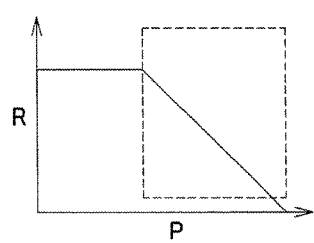
FIGS. 7A and 7B are views for use in explaining the sequence of forming processes of the correction table used in the operation processing unit of one or more embodiments of the present invention.
Figure 7B:
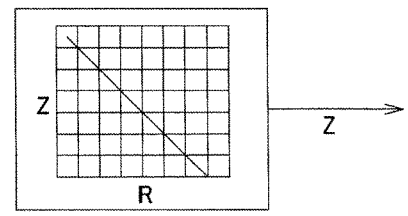

That is, the correction recording means, not shown, is reset to be brought into a stand-by state, and as shown in FIG. 6(A), a head unit 20 mounted on a carriage 25 is made to move on a wedge-shaped spacer 24A mounted on the scale main body 10. With a distance to the scale surface being changed by the wedge-shaped spacer 24A, while the head unit 20 is being moved on the wedge-shaped spacer 24A together with the carriage 25, a scale signal is read so that the resulting position information and signal amplitude R from the position at which the scale signal amplitude R is started to change to the highest point of the spacer 24A are recorded by the correction recording means, not shown. Moreover, as shown in FIG. 7(A), the correction recording means, not shown, converts the positional information into height data from the inclination angle of the wedge-shaped spacer 24A, and by forming a data table between the scale signal amplitude R and the height position Z, as shown in FIG. 7(B), the resulting data table is stored as the correction table 60.

Upon completion of the storage of the correction table 60, as shown in FIG. 6(B), a spacer 24B having an average height of the wedge-shaped spacer 24A is inserted, and the screw 26 is tightened so as to set the height of the head unit 20 mounted on the carriage 25 to the central value thereof.

Then, at the time of an actual use of the magnetic scale device 50, the operation processing unit 30 obtains height data from the correction table 60 based upon the amplitude R calculated from the scale signal, and outputs the resulting data.

In this case, the operation processing unit 30 can also calculate the height data based upon the amplitude R calculated from the scale signal, without using the correction table 60.

That is, by using the correction table 60 in which relationships between the strength of the incremental signals detected by the incremental signal detection heads and the distance between the scale and the incremental signal detection heads are preliminarily recorded, the magnetic scale device 50 generates positional information in accordance with the distance between the scale and the incremental signal detection heads, together with relative positional information in a measuring direction on the measuring axis, based upon the detection outputs by the incremental signal detection heads.

In the magnetic scale device 50, the scale main body 10 is a magnetic scale having a recording medium to which a magnetic pattern is written, and as each of the absolute pattern detection head 21 and the incremental signal detection heads 22$A_1$, 22$A_2$, 22$B_1$, 22$B_2$ of the head unit 20 for detecting a change in magnetic flux in the magnetic patterns written to the recording medium, an MR element whose resistance value is changed by a change in magnetic flux density is used. An MR sensor has its resistance value changed in response to a change in magnetic flux when it is moved in the vicinity of a recording medium. By using a tunnel effect magnetic element as the MR element, it is possible to carry out a detection having a monotonic change in resistance value (attenuated exponentially) with a large dynamic range (up to about 100% in resistance change).

A magnetic field H exerted by the recording medium is indicated by the following expression (11), and since it is attenuated exponentially by the distance Z from the recording medium and the recording wavelength λ, it becomes drastically smaller, as the wavelength becomes shorter.

[Formula 1]

$$H = \frac{I_m}{2\mu_o} \cdot \sin\frac{2\pi x}{\lambda} \cdot e^{(-2\pi z/\lambda)} \cdot (e^{\pi\delta/\lambda} - e^{-\pi\delta/\lambda}) \quad (11)$$

In this expression (11), $I_m$ represents magnetism, and δ represents a recording depth.

Figure 8:
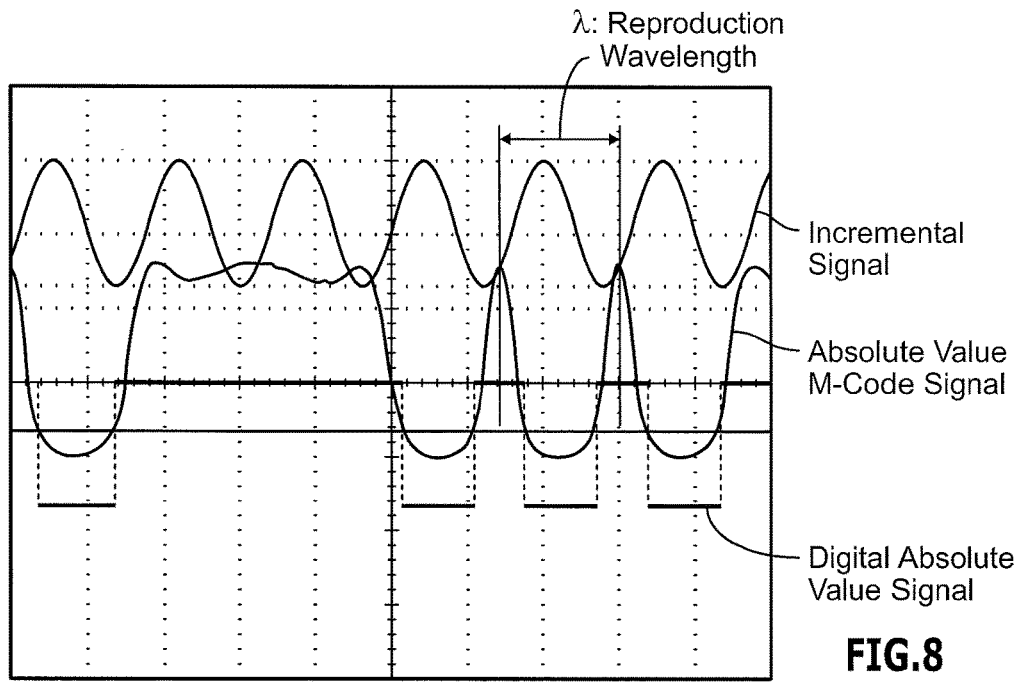
FIG. 8 is a view showing one example of an absolute value M-code signal and an incremental signal obtained in the magnetic scale device according to one or more embodiments of the present invention.

In the magnetic scale device 50, as indicated by the resulting absolute value M-code signal and incremental signal, for example, shown in FIG. 8, the absolute pattern is detected in synchronism with the incremental position. In this example, the signal for use in detecting the absolute value is a digital signal outputted for each pattern, and the incremental signal is a sine wave signal obtained from a set of patterns. Since the absolute value M code signal is detected bit by bit in an individual pattern, it is not possible to obtain a correct detected position even if just one bit is lost. In contrast, the incremental pattern is configured by accumulating many patterns so as to provide one sine wave output, and, for example, if there is one defect in magnetic recording, a sine wave pattern can be outputted without having any influence.

In order to acquire an absolute value signal having a low degree of redundancy without a failure, it is may be necessary to provide a sufficient signal quality. In order to improve the rectangularity ratio of a signal, not only a reference frequency, but also a harmonic component needs to be detected; therefore, the interval between the head and the medium may be narrowed in comparison with that upon detection of the incremental signal or the pitch of a signal pattern for use in obtaining the absolute value may be widened in comparison with the pitch of the incremental signal.

Figure 9:
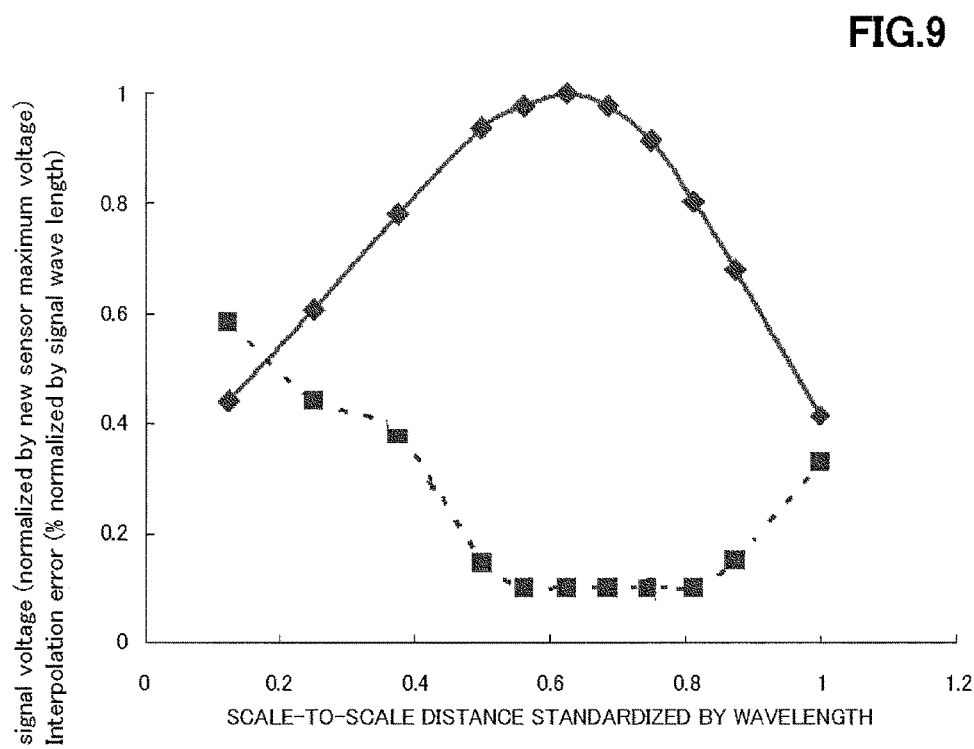
FIG. 9 is a view showing a relationship between a scale-to-scale distance and an incremental signal output that are standardized by a wavelength in the magnetic scale device according to one or more embodiments of the present invention.

Moreover, when the distance between the recording medium forming a scale and the detection head is widened, the detection signal is reduced. As the wavelength of the recording signal is narrowed, that is, as the resolving power becomes higher, the reduction in the signal becomes greater. FIG. 9 shows a relationship between the distance to scale standardized by the wavelength and the incremental signal output.

In FIG. 9, a solid line represents an output and a broken line represents an interpolation error in the case when a signal is simply interpolated as a sine wave. From this graph, it is clarified that by installing a sensor in a manner so as to place a correction range in a section from a point of about $\frac{2}{3}^{rds}$ of the signal wavelength to the signal wavelength, a signal close to a sine wave output can be obtained, and that the signal changes approximately linearly to the distance between the head and the recording material. Although the linearity of this output change is not considered to be good, it is possible to detect the displacement with high precision as long as the scale processing circuit has a correction function for linearity. Different from expression (11), the output drops on the proximity side in experimental data; however, this is because the detection element is formed into a pattern so as to cancel the harmonic component, and in the case when a signal actually recorded is not a sine wave, but a rectangular wave, the signal amplitude of the basic wave drops.

In FIG. 9, a solid line represents an output and a broken line represents an interpolation error in the case when a signal is simply interpolated as a sine wave. From this graph, it is clarified that by installing a sensor in a manner so as to place a correction range in a section from a point of about $\frac{2}{3}^{rds}$ of the signal wavelength to the signal wavelength, a signal close to a sine wave output can be obtained, and that the signal changes approximately linearly to the distance between the head and the recording material. Although the linearity of this output change is not considered to be good, it is possible to detect the displacement with high precision as long as the scale processing circuit has a correction function for linearity. The correction function for linearity corresponds to a correction table on which, for example, the signal outputs and the distances from the heads and the recording material are described, or to a correction function for calculating the distance between the heads and the recording material from a signal output, for example, by using the following relational expression.

[Formula 2]

$$z \approx \log_e(C_1 \cos^{-1}(C_2+C_3 V)) \quad (12)$$

In the expression (12), $C_1$ to $C_3$ represent constants, Z represents a distance between the head and the recording material, and V represents a signal output. Different from expression (11), the output drops on the proximity side in experimental data; however, this is because the detection element is formed into a pattern so as to cancel the harmonic component, and in the case when a signal actually recorded is not a sine wave, but a rectangular wave, the signal amplitude of the basic wave drops.

In this case, supposing that the correction range of the table is set to P-P100 μm and that an attaching error is set to P-P100 μm in the same manner, since the applicable distance between the sensor heads and the recording medium is a $\frac{1}{4}^{th}$ of the signal wavelength including the linearity correction as well, this measuring process is obtained by setting the signal wavelength to 800 μm.

Moreover, when, in general, the signal wavelength becomes larger, the resolving power of a signal becomes worse and the signal referred to as an interpolation error becomes worse in the linearity within the length. What gives influences to the resolving power is mainly the noise level, and in the case when the signal wavelength becomes longer, since the amount of signal change relative to a single resolving power becomes smaller, the noise increases. Although it is easy to electrically increase the number of interpolations, high resolving power becomes meaningless in the case of a poor S/N ratio because of an increased jitter at the time of the stoppage. In the case when the signal wavelength is long, since the signal frequency band is low, it is possible to improve the S/N ratio by using an appropriate low-pass filter, with a data delay being taken into consideration. At present, mainly-used machine tools require a resolving power of 10 nm or more, and in the case of a signal wavelength of 800 μm, when an interpolator having $2^{17}$ divisions is used, a resolving power of about 6 nm can be obtained. This number of the interpolations can be realized by using an AD converter with high resolving power and a technique such as over sampling or the like.

Figure 10:
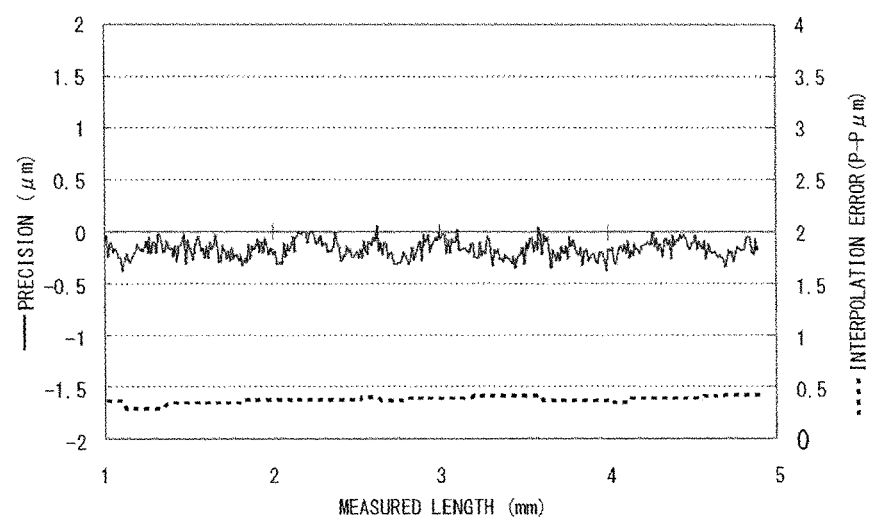
FIG. 10 is a view showing an example of internal insertion precision of a trial scale according to one or more embodiments of the present invention.

On the other hand, in machine tools, when the linearity within a short section is poor, the resulting machined surface does not become smooth, and stripes tend to appear for each wavelength, or for a cycle of one in an integral multiple of the wavelength. As to whether stripes appear or not, it depends on the state of a tool, the hardness of a workpiece, the cutting angle, or the like, and in the case of a general-use machine tool except for a cutting process for optical members, a non-linearity (interpolation error) of 0.5 μm or less is prepared. In the case of a scale with a wavelength of 800 μm used for the present invention, it may be useful to carry out an interpolating process with precision of $\frac{1}{2000}^{th}$ of the wavelength. FIG. 10 shows an example of interpolation precision of a scale produced for a trial purpose. In this example, an interpolation error correction is automatically carried out so that an interpolation error of 0.4 μm was obtained by using a scale with a wavelength of 800 μm.

In this case, the magnetic scale can be attached to a position near a mechanical portion of a machine located in a bad environment and a position near a machining portion, where an Abbe error can be reduced. Moreover, the magnetic scale can carry out recording in an attached state to a machine, and by correcting the record by using precision data at a machining point as reference, errors or the like at the time of assembling can be corrected. In the case of this scale, since recording and precision measurements are carried out after the scale has been attached, no errors are caused due to the attaching process of the scale. Therefore, not a scale of a casing built-in type having high rigidity, but an inexpensive tape-state scale, which is used in a normal machine tool, can be used.

Figure 11:
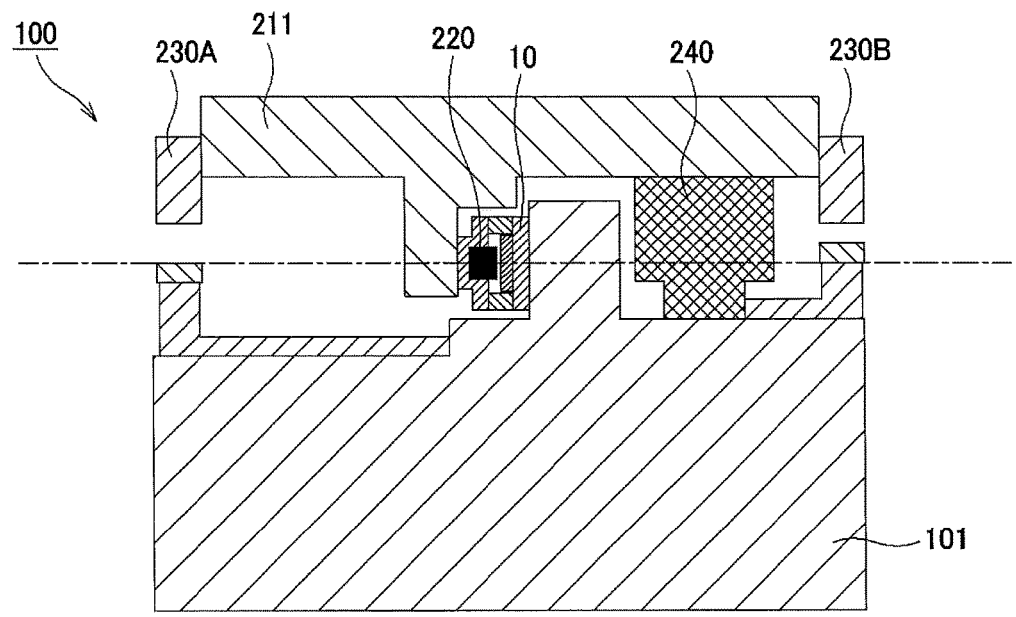
FIG. 11 is a cross-sectional view for use in explaining a recording method of a magnetic scale onto the scale main body in the magnetic scale device according to one or more embodiments of the present invention.
Figure 12:
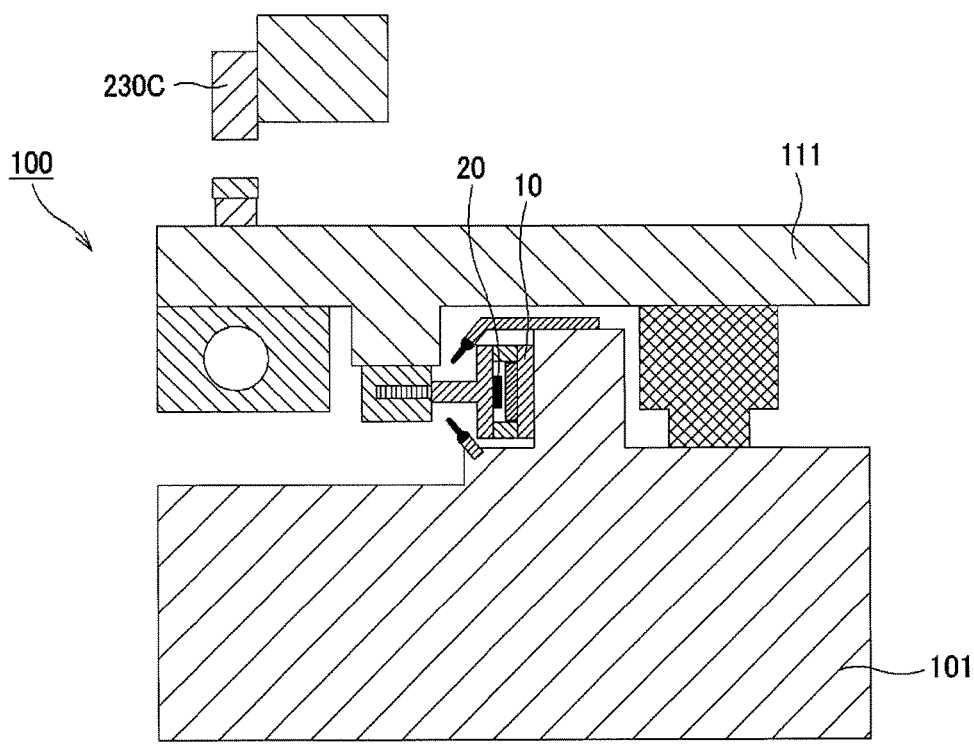
FIG. 12 is a cross-sectional view for use in explaining a precision measuring method of the magnetic scale recorded in the scale main body in the magnetic scale device according to one or more embodiments of the present invention.

FIGS. 11 and 12 show a recording method of the magnetic scale onto the scale main body 10 and a precision measuring method thereof.

That is, as shown in the Figures, a recording process is carried out on the scale main body 10 prior to recording by using a recording magnetic head 220 based upon a measured value by a laser interference meter or a reference scale installed near a machining point. In this example, different reference scales are used at the time of recording and at the time of precision measurements, and at the time of recording, the recording is carried out by correcting an Abbe error by using two reference scales 230A and 230B installed on the two sides of the subject scale main body 10 to be recorded, and as shown in FIG. 12, at the time of precision measurements, a reference scale 230C is installed at a position near the center point of machining of a machine tool 100. The distance between the measuring point and the installation position of the scale main body 10 causes an Abbe error; however, when reproducibility of movements in a stage 111 is prepared, the error is reproduced so that it can be corrected. Moreover, in the case when, after an attaching process of a bed of the stage 111, the recording magnetic head 220 can be attached to carry out recording, and after the recording, it can be detached, the recording can be carried out by the reference scale 230C located in the machining center of the machine tool 111 from the first stage in the same manner as in the precision measurements, and in this case, one portion of movement errors of the machine can be preliminarily corrected and recorded. Moreover, in recent years, since a memory with high capacity can be used at low costs, a tape-shaped scale recorded easily by using an external device is pasted onto a machine, and precision measurements with high precision can be carried out on the machine tool 100 so as to be corrected with high precision.

Figure 13:
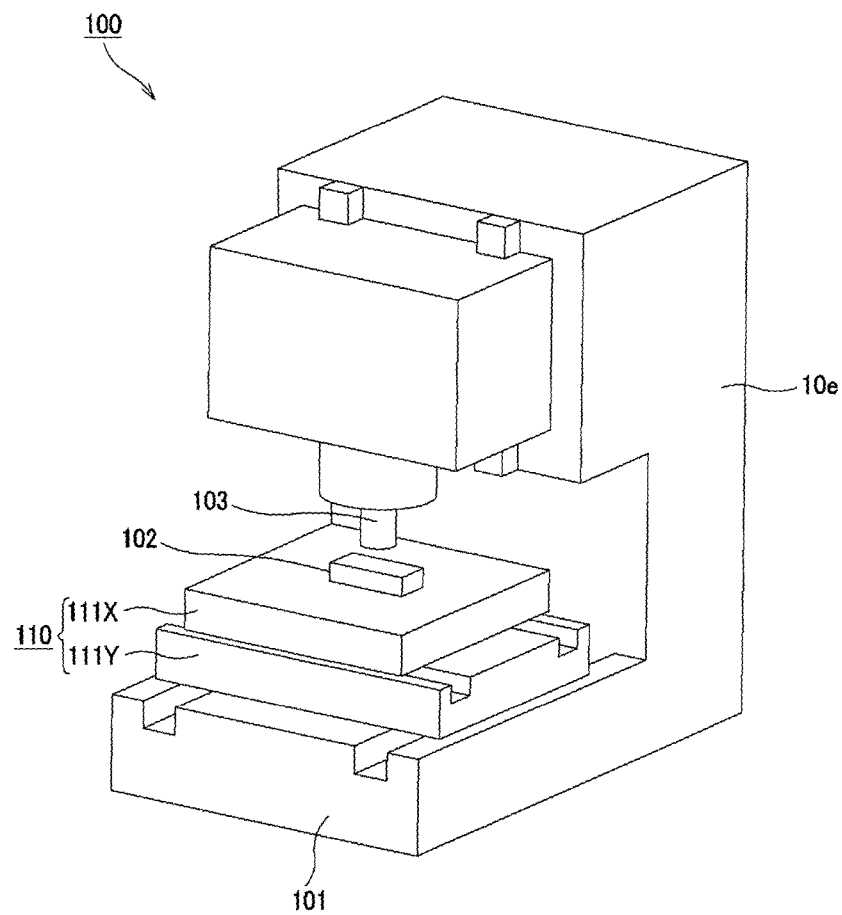
FIG. 13 is a perspective view showing a configuration of a machine tool in which the magnetic scale device is installed according to one or more embodiments of the present invention.

For example, the magnetic scale device 50 is applied to an XY stage device 110 in the machine tool 100 having the configuration as shown in FIG. 13.

This multiaxial stage device 100 is used for machining a workpiece 102 mounted on the multiaxial stage device 110 mounted on, for example, a base 101 by using a tool 103 capable of shifting in vertical directions (Z-axis directions).

The multiaxial stage device 110 is an XY stage device capable of moving in X-axis directions and Y-axis directions that are mutually orthogonal to each other on a horizontal plane, and composed of a Y stage 111Y placed so as to freely move in the X-axis directions on the base 101 and an X stage 111X placed so as to freely move in the X-axis directions on the Y stage 111Y.

Figure 14:
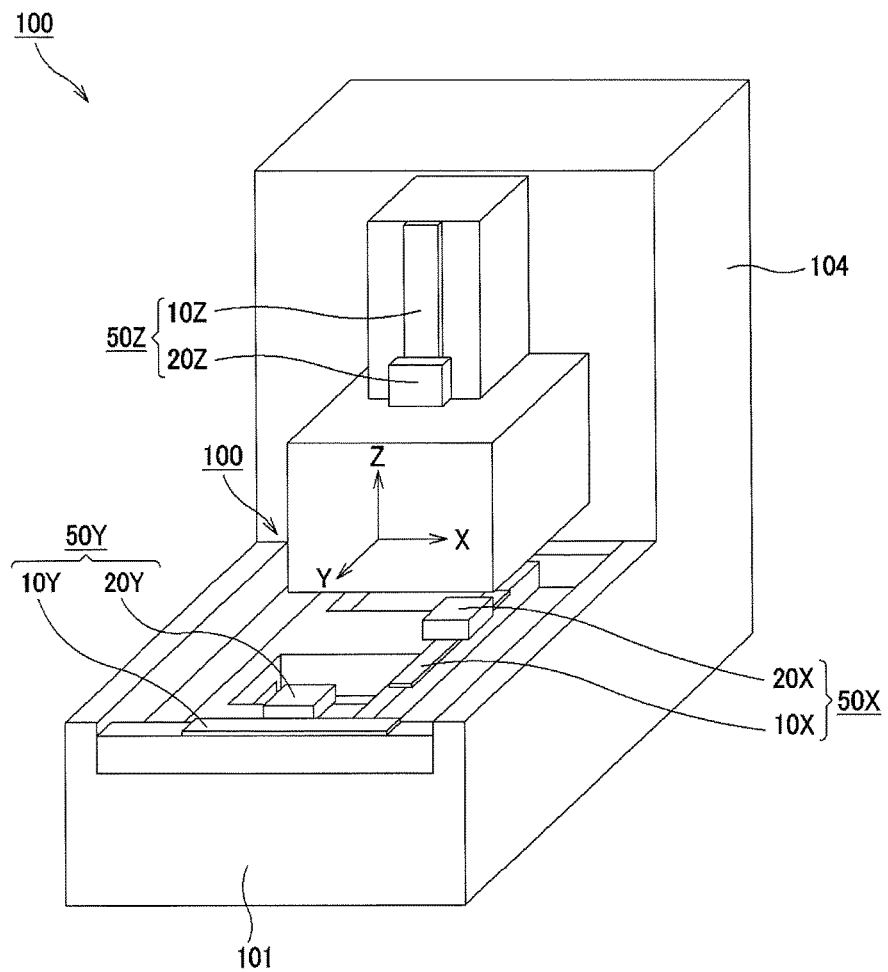
FIG. 14 is a perspective view showing a mounting position of the magnetic scale device in the machine tool according to one or more embodiments of the present invention.

Moreover, as shown in FIG. 14, in this machine tool 100, an X-axis scale device 50X for detecting a displacement in an X-axis direction of the X stage 111X, a Y-axis scale device 50Y for detecting a displacement in a Y-axis direction of the Y stage 111Y and a Z-axis scale device 50Z for detecting a displacement in a Z-axis direction of the tool 103 are installed.

For each of the X-axis scale device 50X, the Y-axis scale device 50Y and the Z-axis scale device 50Z, the magnetic scale device 50 configured by the above-mentioned scale main body 10, the head unit 20 and the operation processing unit 30 is used.

That is, in the machine tool 100, the Y-axis scale device 50Y is placed on the base 101 with its scale main body 10Y being aligned in the Y-axis direction as its longitudinal direction, and a head unit 20Y is placed on the Y-axis stage 111Y that is moved in the Y-axis direction on the base 101.

Moreover, the X-axis scale device 50X is placed on the Y stage 111Y with its scale main body 10X being aligned in the Y-axis direction as its longitudinal direction, and a head unit 20X is placed on the X stage 111X that is moved in the X-axis direction on the Y stage 111Y.

Furthermore, the Z-axis scale device 50Z is placed on a strut portion 104 formed on the base 101 with its scale main body 10Z being aligned in the Z-axis direction as its longitudinal direction, and a head unit 20Z is placed on an attaching block of the tool 103 that is moved in the Z-axis directions along the strut portion 104.

Figure 15:
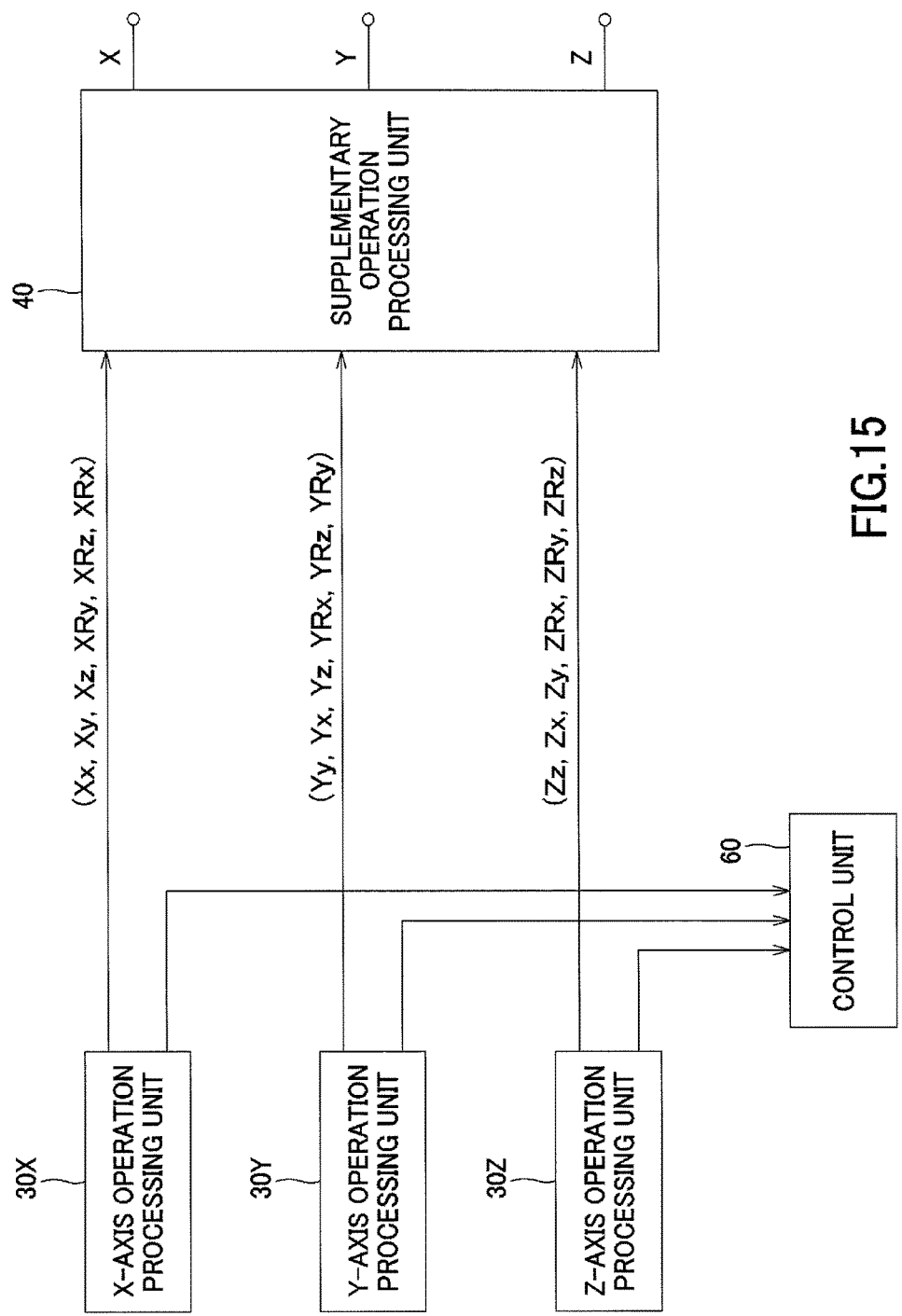
FIG. 15 is a block diagram showing a configuration of an operation processing unit in the machine tool according to one or more embodiments of the present invention.
Figure 16:
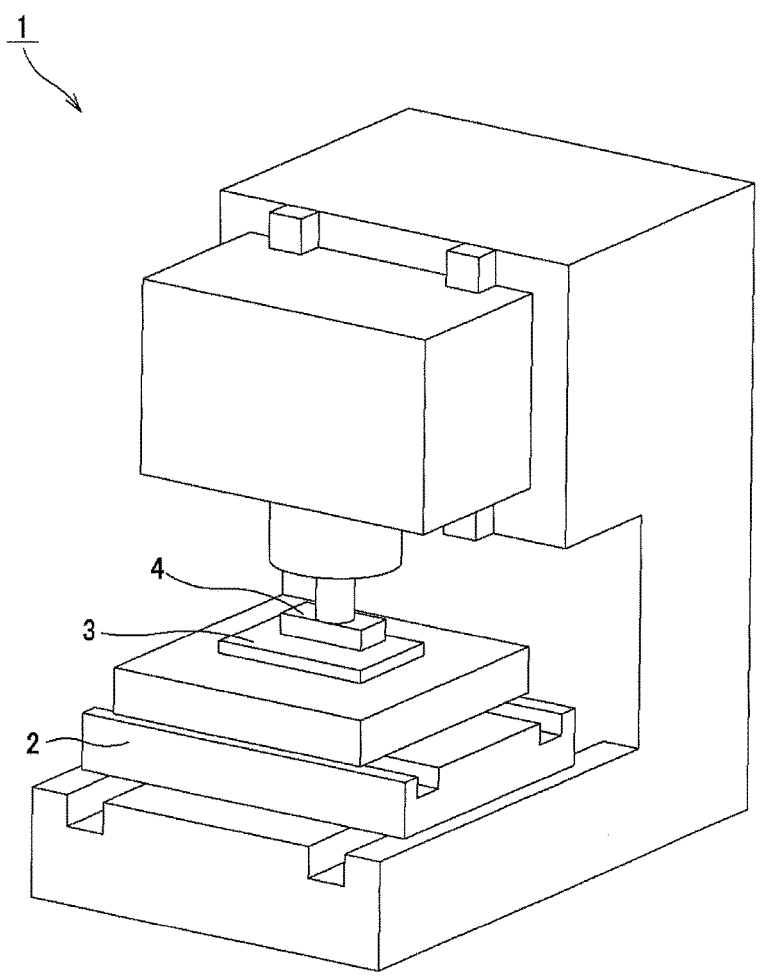
FIG. 16 is a perspective view showing a machine tool for use in explaining a technique previously proposed.
Figure 17:
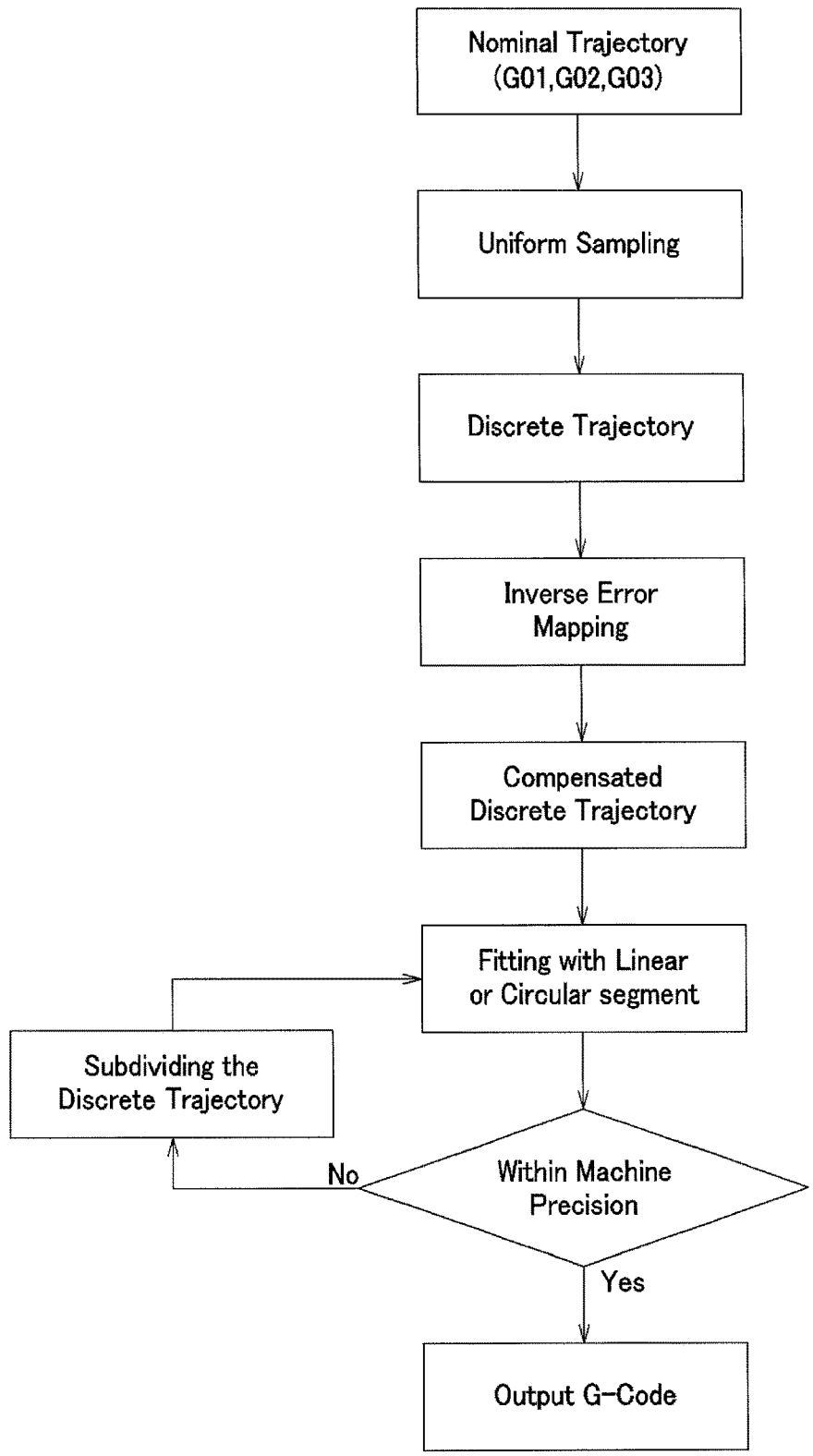
FIG. 17 is a flow chart showing the technique previously proposed.
Figures 18A, 18B:
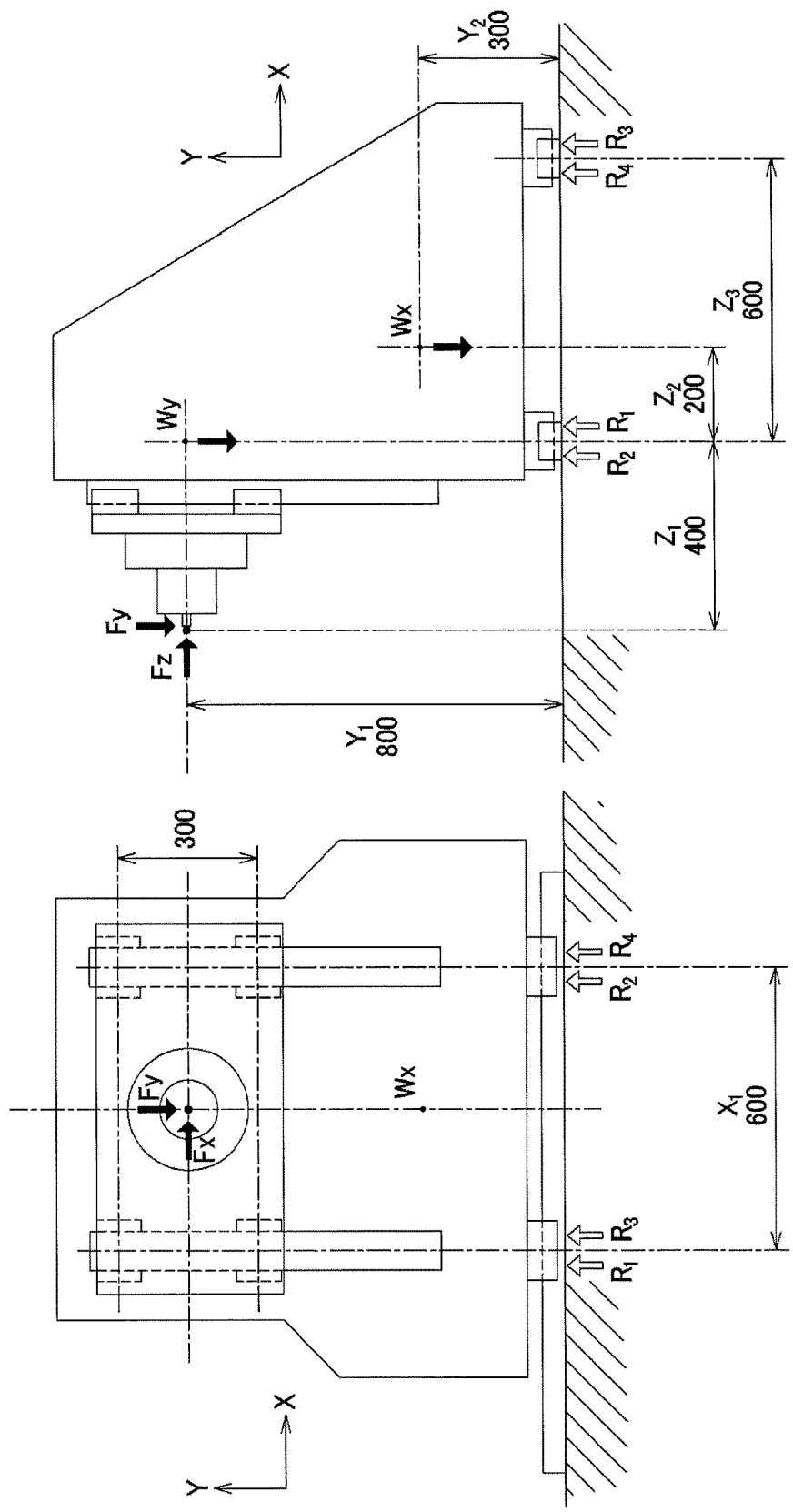
FIGS. 18A and 18B are views showing a deflection calculation model in a small-size machine used for calculations as to what degree of errors, such as deflection in a head due to influences of a cutting reaction force at the time of a machining process and own weight of a workpiece, would be generated after the correcting process.

As shown in FIG. 15, respective operation processing units 30X, 30Y and 30Z of the X-axis scale device 50X, the Y-axis scale device 50Y and the Z-axis scale device 50Z are adapted to supply positional information indicating the absolute position and relative positions on the respective main movement axes, parallel movement amount information in the horizontal direction orthogonal to the main movement axis, parallel movement amount information in the vertical direction orthogonal to the main movement axis, rotation angle information in yawing direction, rotation angle information in the pitching direction and rotation angle information in the rolling direction to a supplementary operation processing unit 40.

That is, based upon the detection output detected from the scale main body 10X by the head unit 20X, the X-axis operation processing unit 30X generates positional information Xx indicating the absolute position and relative positions on the X axis, parallel movement amount information Xy in the horizontal direction orthogonal to the X axis, that is, in the Y-axis direction, parallel movement amount information Xz in the vertical direction orthogonal to the X axis, that is, in the Z-axis direction, rotation angle information XRy indicating X-axis rolling and pitching rotation, that is, in a direction around the Y axis, rotation angle information XRz indicating X-axis azimuth, that is, in a direction around the Z axis, and rotation angle information XRx indicating X-axis rolling, that is, in a direction around the X axis, and supplies these pieces of information to the supplementary operation processing unit 40.

Moreover, based upon the detection output detected from the scale main body 10Y by the head unit 20Y, the Y-axis operation processing unit 30Y generates positional information Yy indicating the absolute position and relative positions on the Y axis, parallel movement amount information Yx in the horizontal direction orthogonal to the Y axis, that is, in the X-axis direction, parallel movement amount information Yz in the vertical direction orthogonal to the Y axis, that is, in the Z-axis direction, rotation angle information YRx indicating Y-axis rake rotation, that is, in a direction around the Y axis, rotation angle information YRz indicating Y-axis yawing, that is, in a direction around the Z axis, and rotation angle information YRy indicating Y-axis rolling, that is, in a direction around the Y axis, and supplies these pieces of information to the supplementary operation processing unit 40.

Furthermore, based upon the detection output detected from the scale main body 10Z by the head unit 20Z, the Z-axis operation processing unit 30Z generates positional information Zz indicating the absolute position and relative positions on the Z axis, parallel movement amount information Zx on the X axis orthogonal to the Z axis, parallel movement amount information Zy on the Z axis in the Y direction, rotation angle information ZRx indicating Z-axis rake rotation, that is, in a direction around the X axis, rotation angle information ZRy indicating Z-axis azimuth, that is, in a direction around the Y axis, and rotation angle information ZRz indicating Z-axis rolling, that is, in a direction around the Z axis, and supplies these pieces of information to the supplementary operation processing unit 40.

Thus, based upon various pieces of information supplied from the respective operation processing units 30X, 30Y and 30Z, the supplementary operation processing units 40 carries out supplementary operation processes of the positional information X, Y and Z in a three-dimensional space (XYZ) on the multiaxial stage device 110 in the machine tool 100 in the following manner, and mutually supplements positional data obtained from the scale main bodies 10X, 10Y and 10Z of the respective axes to obtain positional information.

$$Y = Xx + Yx + Zx + Lx \cdot XRz + Yy \cdot YRz + Zz \cdot ZRy$$

$$X = Yy + Xy + Zy + Ly \cdot YRz + Xx \cdot XRz + Zz \cdot ZRx$$

$$Z = Zz + Xz + Yz + Lx \cdot XRx + Ly \cdot YRy + Xx \cdot XRy + Yy \cdot YRx$$

In this case, each of Lx and Ly is a distance from the stage center to the scale. Additionally, the Z axis is supposed to be attached as an inline axis.

These corrections are carried out on the three axes, and the resulting corrections make it possible to improve the precision of the machine tool 100. Moreover, by always carrying out the corrections, it is possible to obtain an advantage of monitoring the state change in the machine tool 100, and consequently to monitor the precision of the machine tool.

In this case, in this machine tool 100, each of the operation processing units 30X, 30Y and 30Z is allowed to generate an alarm in the case when among the positional data obtained from the scale main bodies 10X, 10Y and 10Z of the respective axes, a displacement other than that of the measuring axis exceeds a predetermined value D.

The scale device 50 is configured so as to generate relative positional information in a measuring direction of the measuring axis, as well as to generate parallel movement amount information in a direction orthogonal to the measuring direction and rotation angle information in yawing direction; therefore, the head unit 20 is designed to have at least three or more (in this example, four) incremental signal detection heads $22A_1$, $22A_2$, $22B_1$ and $22B_2$ for detecting incremental signals from at least incremental tracks 12A and 12B; however, in the case when used for an application that requires no rotation angle information in yawing direction, a single incremental signal detection head may be used for each of the tracks.

In other words, the scale device in accordance with one or more embodiments of the present invention may be designed to have a scale main body provided with at least two incremental tracks, and an operation processing unit which generates parallel movement amount information in a direction orthogonal to the measuring direction based upon detection outputs by two or more incremental signal detection heads that detect incremental signals from the incremental tracks.

Moreover, in the scale device 50, so as to carry out measuring processes even in a bad environment contaminated with a cutting fluid and chips, from the scale main body 10 having the absolute track 11 and the incremental tracks 12A and 12B magnetically recorded, a change in magnetic flux of the magnetic pattern written in a recording medium is detected by using the absolute pattern detection head 21 and the incremental signal detection heads $22A_1$, $22A_2$, $22B_1$ and $22B_2$ of the head unit 20; however, in principle, any of detection methods of an optical type, a magnetic type, an electrostatic capacity type and an electromagnetic induction type may be adopted. In this case, in order to obtain information in the Z-direction, a system having a change in the Z-direction displacement may be used, with the change being a monotonic change. The magnetic type, electrostatic capacity type and electromagnetic induction type may be used because of their monotonic change. Moreover, in the case of the magnetic type, by using a tunnel effect magnetic element as the detection head, it becomes possible to carry out a detection having a monotonic change (attenuated exponentially) with a large dynamic range (up to about 100% in resistance change).

Figure 19:
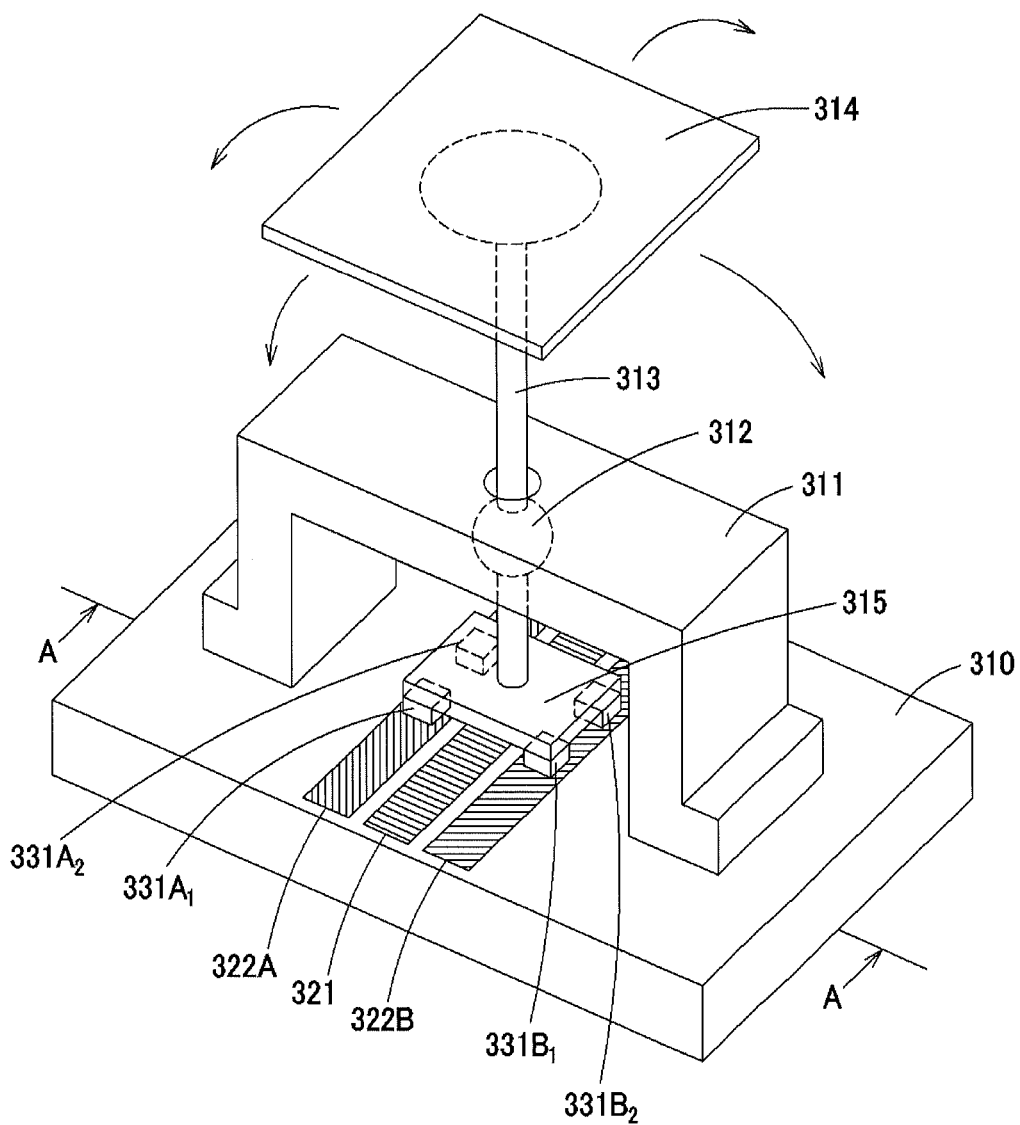
FIG. 19 is a perspective view showing an example of another configuration of a scale device to which one or more embodiments of the present invention are applied.
Figure 20:
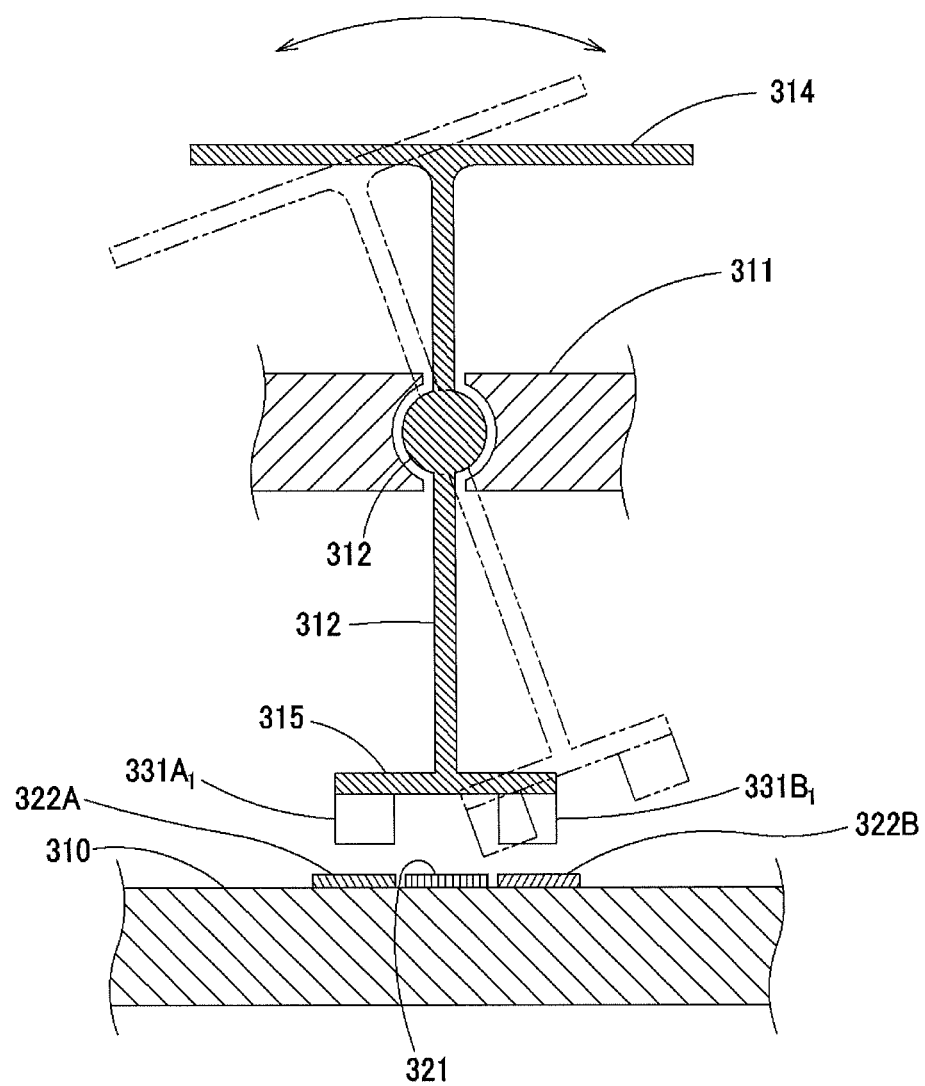
FIG. 20 is an A-A' line cross sectional view of the above-mentioned scale device.

Moreover, in the scale device 50, the head unit 20 is designed to relatively move linearly in the main movement axis direction relative to the scale main body 10; however, since relative positional information in the measuring direction on the measuring axis is generated, and since parallel movement amount information in a direction orthogonal to the measuring direction and rotation angle information in yawing direction can also be obtained, the relative moving direction between the scale main body 10 and the head unit 20 is not limited to the linear direction, but includes a change in an arbitral direction, and for example, as in the case of a scale device 300 shown in FIGS. 19 and 20, another structure may be used in which the head unit is moved relative to the linear scale in a manner like a pendulum.

FIG. 19 is a perspective view showing the scale device 300 to which one or more embodiments of the present invention are applied, and FIG. 20 is an A-A' line cross-sectional view of the scale device 300.

The scale device 300 is formed by applying one or more embodiments of the present invention to a position detection device for detecting an inclination position of an inclination plate 314 installed on the upper end portion of a support axis 312.

The support axis 312 is supported by a spherical bearing 313 attached to a support base 311 placed on a base substrate 310 so as to freely swing thereon, and provided with an attaching plate 315 formed on its lower end portion.

On the base substrate 310, an absolute track 321 on which an absolute pattern is magnetically recorded and incremental tracks 322A and 322B on which incremental signal patterns are magnetically recorded in such a manner as to be inclined by 45 degrees in reversed directions relative to the measuring direction are installed on two sides of this absolute track 321.

The support base 311 is installed on the base substrate 310 in a manner so as to stride over the absolute track 321 and the incremental tracks 322A and 322B.

The inclination plate 314, which is formed on the upper end portion of the support axis 312 supported by the spherical bearing 313 formed on the support base 311, is supported by a single fulcrum, that is, the spherical bearing 313, in a manner so as to swing freely, and allowed to take a desired inclined posture state.

Moreover, the support plate 315, which is formed on the lower end portion of the support axis supported by the spherical bearing 312 formed on the support base 311, is supported by a single fulcrum, that is, the spherical bearing 313, in a manner so as to swing freely, and allowed to take a desired inclined posture state corresponding to the desired inclined posture state of the inclination pate 314.

Then, four detection heads 331A1, 331A2, 331B1 and 331B2 for detecting incremental signals from the incremental tracks 322A and 322B are disposed on four corners on the lower surface of the support plate 315.

In this scale device 300, based upon relative positional information obtained from the incremental tracks 322A and 322B by the detection heads 331A, 331A2, 331B1, 331B1 that are supported by the single fulcrum, that is, the spherical bearing 313 in a manner so as to freely swing thereon, and are operated so as to move in a manner like a pendulum in response to a change in the inclined posture state of the inclination plate 314, that is, based upon relative positional information in a measuring direction on the measuring axis, parallel movement amount information in a direction orthogonal to the measuring direction, rotation angle information in yawing direction, and the like, positional information indicating an inclined posture state of the inclination plate 314 can be obtained by the operation processing unit 30 in the magnetic scale device 50.

A position detection device provided with the scale device 300, which has, for example, a mirror attached to the inclination plate 314, forms a mirror control mechanism that alters and controls a reflection direction of light by the mirror by using a control motor or the like based upon the positional information obtained by the scale device 300. This mirror control mechanism may be used for various mirror control apparatuses typically including, for example, such an apparatus for use in controlling individual mirrors of a reflection telescope, or the like.

Although the disclosure has been described with respect to only a limited number of embodiments, those skilled in the art, having benefit of this disclosure, will appreciate that other embodiments can be devised which do not depart from the scope of the present disclosure. Accordingly, the scope of the present disclosure should be limited only by the attached claims.

What is claimed is:

1. A scale device, comprising:
A scale main body that comprises at least one incremental track;
two or more incremental signal detection heads that detect incremental signals from the incremental track; and
an operation processing unit that generates, using operating detection outputs by each of the two or more incremental signal detection heads:
relative positional information in an X axis direction of a measuring axis, and movement amount information in a direction of an X axis and a Z axis that includes a distance between the scale and the two or more incremental signal detection heads.

2. The scale device according to claim 1, wherein
the scale main body comprises two incremental tracks and at least three incremental signal detection heads of the two or more incremental signal detection heads that detect incremental signals from the two incremental tracks, and
based upon detection outputs by the at least three incremental signal detection heads, the operation processing unit generates the movement amount information in each axial direction of the X and Z axis, the movement amount information in each axial direction of the Y and Z axis, and the movement amount information in each axial direction of the X, Y, and Z axis.

3. The scale device according to claim 1, wherein the measurement principle is magnetic, having a magnetic recording medium in which the at least one incremental track is magnetically recorded and the two or more incremental signal detection heads are magnetic detection heads.

4. The scale device according to claim 3, wherein the magnetic detection head is a tunnel Magneto-Resistance Effect element.

5. The scale device according to claim 2, further comprising:
a support mechanism for supporting the two or more incremental signal detection heads by a single fulcrum so as to freely swing thereon, with each of the two or more incremental signal detection heads being operated in a manner like a pendulum.

6. The scale device according to claim 2, wherein the scale main body is provided with an absolute track on which an absolute pattern is recorded and incremental tracks formed by recording incremental signal patterns in a manner so as to be inclined relative to a measuring direction on two sides of the absolute track, as well as a single absolute pattern detection head for detecting the absolute pattern from the absolute track of the scale main body and at least two incremental signal detection heads of the two or more incremental signal detection heads for detecting incremental signals from the incremental tracks, and
wherein the operation processing unit generates absolute positional information based upon a detection output by the absolute pattern detection head, and also generates relative positional information in a measuring direction of a measuring axis and movement amount information in a direction orthogonal to the measuring direction based upon detection outputs by the at least three incremental signal detection heads located on the two incremental tracks formed with the absolute track being sandwiched therebetween.

7. The scale device according to claim 6, wherein based upon detection outputs by two of the at least three incremental signal detection heads located apart from each other in the measuring direction of a measuring axis on the incremental track, the operation processing unit generates movement amount information in a direction orthogonal to the measuring direction and rotation angle information in yawing direction.

8. The scale device according to claim 7, wherein the operation processing unit further calculates distances between the at least three incremental signal detection heads and the scale based upon strength of signals detected by the two or more incremental signal detection heads, and generates movement amount information in a Z-direction and rolling and pitching angle information.

9. The scale device according to claim 2, wherein the operation processing unit further comprises a correction table in which changes relative to changes in the scale-to-head distance of detection outputs by the at least three incremental signal detection heads are preliminarily recorded.

10. The scale device according to claim 9, further comprising:
measuring means for measuring change information relative to a change in a scale-to-head distance of the detection output by the at least three incremental signal detection heads, after having been installed in a measurement-subject device; and
correction data recording means for writing correction data formed based upon the change information obtained by the measuring means in the correction table.

11. The scale device according to claim 6, wherein the measurement principle is magnetic, having a magnetic recording medium in which an absolute pattern and incremental signal patterns are magnetically recorded, and the absolute pattern detection head and the at least three incremental signal detections head are magnetic detection heads.

12. The scale device according to claim 11, wherein the incremental track is formed by magnetically recording incremental signal patterns on at least one side of the absolute track in a manner so as to be inclined by 45 degrees in reversed directions relative to a measuring direction.

13. The scale device according to claim 11, wherein the magnetic detection head is a tunnel Magneto-Resistance Effect element.

14. A multiaxial stage device comprising:
a scale main body that comprises an absolute track with an absolute pattern and incremental tracks formed by incremental signal patterns placed on both sides of the absolute track to be inclined by 45 degrees in reversed directions relative to a measuring direction, which is placed on each axis; and
an operation processing unit which based upon a detection output by an absolute pattern detection head for detecting the absolute pattern from the absolute track of the scale main body of each of the axes, generates absolute positional information, and by detecting incremental signals by at least three incremental signal detection heads from the incremental tracks, by at least three incremental signal detection heads located on the two incremental tracks formed with the absolute track being sandwiched therebetween, generates relative positional information in a measuring direction on a measuring axis and movement amount information in two axial directions of the measurement direction of the measurement axis and the direction that is orthogonal to the measurement direction of the measurement axis, or movement amount information in three axial directions of the measuring direction of the measuring axis and the directions that are mutually orthogonal to the measuring direction of the measuring axis, so that positional information is obtained, with the positional data obtained from the scale main bodies of the respective axes being mutually supplemented,
wherein the movement amount information in a direction of an X axis and a Z axis are generated by the operation processing unit using an operating detection output of one of the at least three incremental signal detection heads, and wherein the movement amount information includes a distance between the scale and the two or more incremental signal detection heads.

15. The multiaxial stage device according to claim 14, wherein two or more of the scale main bodies are attached to an XY stage so that positional information is obtained, with the positional data obtained from the scale main bodies of the respective axes being mutually supplemented.

16. The multiaxial stage device according to claim 14, wherein three or more of the scale main bodies are attached to an XYZ stage so that positional information is obtained, with the positional data obtained from the scale main bodies of the respective axes being mutually supplemented.

17. The multiaxial stage device according to claim 14, further comprising:
alarm generation means for generating an alarm in the case when among positional data obtained from the scale main bodies of the respective axes, a displacement other than the displacement of the corresponding measuring axis exceeds a predetermined value.

18. The multiaxial stage device according to claim 14, wherein by operating detection outputs by the at least three incremental signal detection heads, the operation processing unit generates movement amount information in directions of respective X, Y and Z axes and rotation angle information around the respective axes.

19. The multiaxial stage device according to claim 14, wherein by operating detection outputs by two of the at least three incremental signal detection heads located apart from each other in the measuring direction of a measuring axis on the incremental track, the operation processing unit generates movement amount information in a direction orthogonal to the measuring direction and rotation angle information in yawing direction so that positional information is obtained, with the positional data obtained from the scale main bodies of the respective axes being mutually supplemented.

20. The multiaxial stage device according to claim 18, wherein the measurement principle is magnetic, having a magnetic recording medium in which an absolute track with the absolute pattern and the at least one incremental track are magnetically recorded and the at least three incremental signal detection heads is a magnetic detection head.

21. The multiaxial stage device according to claim 20, wherein the magnetic detection head is a tunnel Magneto-Resistance Effect element.

22. A scale device, comprising:
a scale that comprises at least one incremental track on which an incremental pattern is recorded;
two or more incremental signal detection heads that detect the incremental pattern;
an operation processing unit that generates, using operating detection outputs by each of the two or more incremental signal detection heads:
relative positional information in an X axis direction of a measuring axis, and
movement amount information in a direction of an X axis and a Z axis that includes a distance between the scale and the two or more incremental signal detection heads; and
a first correction table on which a relationship between the strength of the incremental signals detected by the two or more incremental signal detection heads and a distance between the scale and the two or more incremental signal detection heads has been preliminarily recorded.

23. The scale device according to claim 22, further comprising:
a second correction table for correcting a relationship between the incremental signals in association with the distance between the scale and the two or more incremental signal detection heads and a movement distance in a measuring direction.

24. The scale device according to claim 23, further comprising:
two incremental tracks;
at least three incremental detection heads that detect incremental signals from the two incremental tracks; and
a third correction table in which changes relative to changes in a scale-to-head distance of detection outputs by at least three incremental signal detection heads of the two or more incremental signal detection heads are preliminarily recorded,
wherein the changes in the scale-to-head distance are measured when the scale and the at least three incremental signal detection heads are parallel to each other,
wherein by using the correction table, distances between the at least three incremental signal detection heads and the scale are calculated based upon strength of signals detected by the at least three incremental signal detection heads so that movement amount information in a Z-direction and rolling and pitching angle information are generated.

25. The scale device according to claim 22, wherein the measurement principle is magnetic, having a magnetic recording medium in which the incremental pattern is magnetically recorded and the two or more incremental signal detection heads are magnetic detection heads.

26. A scale device, comprising:
a scale that comprises at least one incremental track on which an incremental pattern is recorded;
two or more incremental signal detection heads that detect the incremental pattern; and operation means for:
finding a relationship between the strength of the incremental signal detected by the two or more incremental signal detection heads and a distance between the scale and the two or more incremental signal detection heads, and
generating, using operating detection outputs by each of the two or more incremental signal detection heads:
relative positional information in an X axis direction of a measuring axis, and
movement amount information in a direction of an X axis and a Z axis that includes a distance between the scale and the two or more incremental signal detection heads.

* * * * *